US007814418B2

(12) United States Patent
Chosokabe

(10) Patent No.: US 7,814,418 B2
(45) Date of Patent: Oct. 12, 2010

(54) DISPLAY APPARATUS, DISPLAY METHOD, AND DISPLAY PROGRAM

(75) Inventor: Yoshihiro Chosokabe, Nagano (JP)

(73) Assignee: Sony Corporation, Tokyo (JP)

( * ) Notice: Subject to any disclaimer, the term of this patent is extended or adjusted under 35 U.S.C. 154(b) by 860 days.

(21) Appl. No.: 11/655,011

(22) Filed: Jan. 18, 2007

(65) Prior Publication Data

US 2007/0182741 A1 Aug. 9, 2007

(30) Foreign Application Priority Data

Jan. 23, 2006 (JP) ............................. 2006-014213

(51) Int. Cl.
*G06F 17/00* (2006.01)
*G10H 1/00* (2006.01)

(52) U.S. Cl. ....................................... 715/273; 84/600
(58) Field of Classification Search ................. 715/273; 84/600

See application file for complete search history.

(56) References Cited

U.S. PATENT DOCUMENTS

| 7,227,071 | B2 * | 6/2007 | Tagawa et al. ................. 84/601 |
| 7,231,389 | B2 * | 6/2007 | Yamane et al. ................. 707/5 |
| 7,268,288 | B2 * | 9/2007 | Yamane et al. ................. 84/615 |
| 7,373,209 | B2 * | 5/2008 | Tagawa et al. ................. 700/94 |
| 7,571,183 | B2 * | 8/2009 | Renshaw et al. ............. 707/102 |
| 2001/0029429 | A1 * | 10/2001 | Katayama et al. ........... 701/209 |
| 2002/0061125 | A1 * | 5/2002 | Fujii ........................... 382/125 |
| 2002/0172372 | A1 * | 11/2002 | Tagawa et al. ................. 381/56 |
| 2004/0003706 | A1 * | 1/2004 | Tagawa et al. ................. 84/609 |
| 2004/0255761 | A1 * | 12/2004 | Yamane et al. ................. 84/615 |
| 2004/0267736 | A1 * | 12/2004 | Yamane et al. ................. 707/3 |
| 2007/0143268 | A1 * | 6/2007 | Chosokabe .................... 707/3 |
| 2007/0274546 | A1 * | 11/2007 | Hirayama ................... 381/300 |
| 2008/0059870 | A1 * | 3/2008 | Kim et al. .................... 715/203 |
| 2008/0222128 | A1 * | 9/2008 | Yoshida et al. ................. 707/5 |

FOREIGN PATENT DOCUMENTS

WO    WO 2005050615 A1 *  6/2005

* cited by examiner

*Primary Examiner*—Rachna S Desai
(74) *Attorney, Agent, or Firm*—Wolf, Greenfield & Sacks, P.C.

(57) ABSTRACT

Disclosed herein is a display apparatus including: a display control section configured to cause a display to display an image that contains a plurality of content indication marks each associated with a separate content, each of the plurality of content indication marks being arranged at a position corresponding to an impression of the content with which the mark is associated; and a selection section configured to select two or more content indication marks from the plurality of content indication marks arranged in the image. When the two or more content indication marks are selected by the selection section, the display control section displays, on the image, a line segment that joins the selected two or more content indication marks so as to indicate an order in which the contents corresponding to the selected two or more content indication marks are arranged.

15 Claims, 29 Drawing Sheets

| SPEED (TEMPO) | IMPRESSION OF BEING SLOW ←→ IMPRESSION OF BEING FAST |
|---|---|
| TONE COLOR | IMPRESSION OF BEING "ANALOG" ←→ IMPRESSION OF BEING "DIGITAL" |
| PERIOD | IMPRESSION OF BEING OLD ←→ IMPRESSION OF BEING NEW |

FIG. 8

40
41
42
3D
SI
Cu
AX
fast
newly
elec
43
44
45
46
47
48
49
50
51
South One Stars
BALLAD
MOON LIGHT
Y:¥MP3¥RED Chili PeS*THE WAY*ON MERC..mp3
Play List
Q Search

FIG.9

| | Title | |
|---|---|---|
| 1 | C:¥MP3¥AAA¥ABC.mp3 | ← SS$_1$ |
| 2 | Y:¥MP3¥RCP¥BTW.mp3 | ← SS$_2$ |
| 3 | C:¥MP3¥ABZ¥YHA.mp3 | ← SS$_3$ |
| 4 | C:¥MP3¥FEK¥KHV.mp3 | ← SS$_4$ |
| 5 | C:¥MP3¥OHR¥PRN.mp3 | ← SS$_5$ |
| 6 | C:¥MP3¥LKR¥UMH.mp3 | ← SS$_6$ |
| 7 | C:¥MP3¥MFX¥FEI.mp3 | ← SS$_7$ |
| 8 | Y:¥MP3¥EHE¥NER.mp3 | ← SS$_8$ |

PL

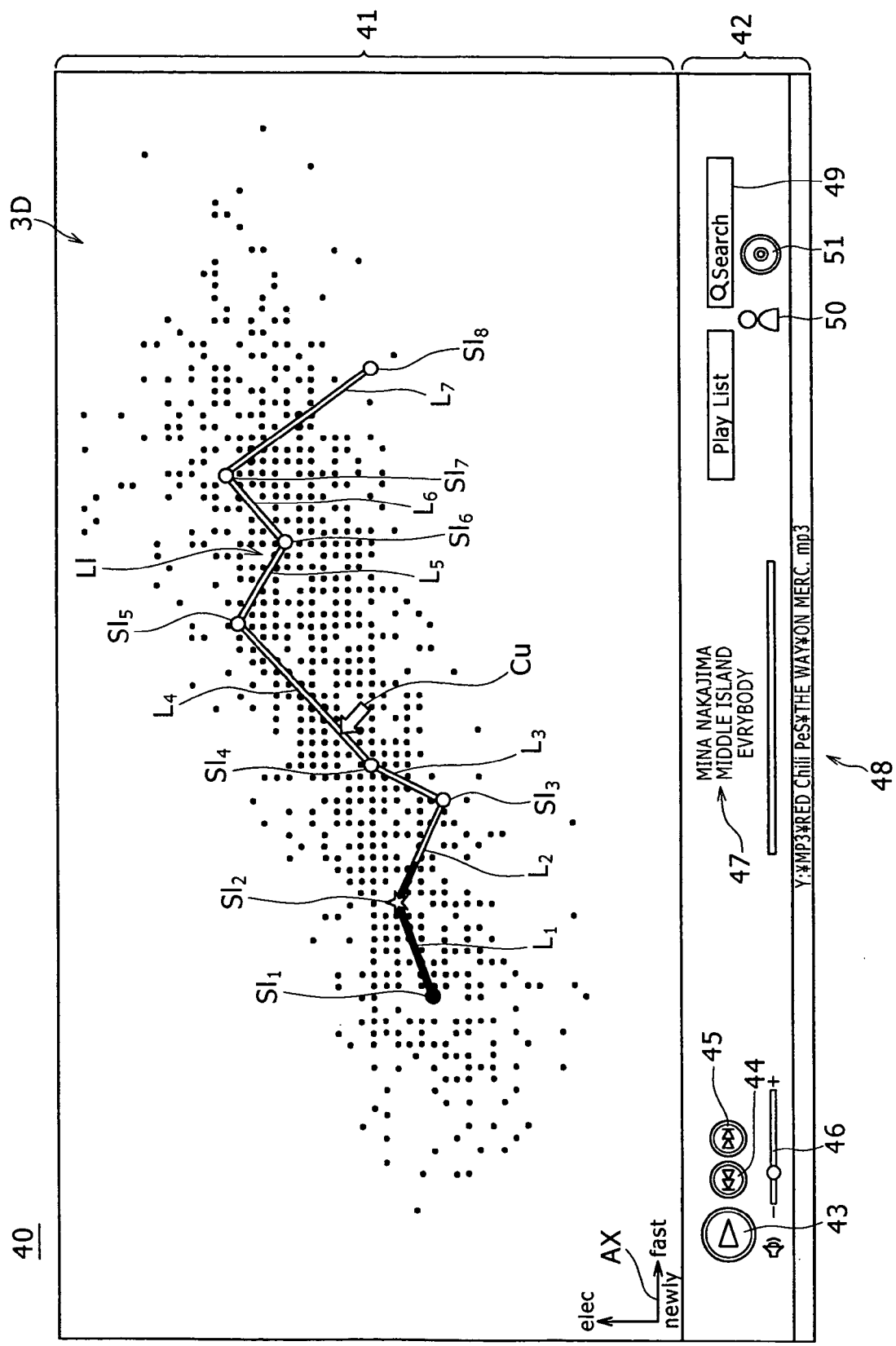

| | Title | |
|---|---|---|
| 1 | C:¥MP3¥AAA¥ABC.mp3 | ← SS₁ |
| 2 | Y:¥MP3¥RCP¥BTW.mp3 | ← SS₂ |
| 3 | C:¥MP3¥ABZ¥YHA.mp3 | ← SS₃ |
| 4 | Y:¥MP3¥EHE¥NER.mp3 | ← SS₈ |

| | Title | |
|---|---|---|
| 1 | C:¥MP3¥FEK¥KHV.mp3 | ← SS₄ |
| 2 | C:¥MP3¥OHR¥PRN.mp3 | ← SS₅ |
| 3 | C:¥MP3¥LKR¥UMH.mp3 | ← SS₆ |
| 4 | C:¥MP3¥MFX¥FEI.mp3 | ← SS₇ |

FIG.20A

PLx

| FIVE MOST POPULAR MUSICAL PIECES | | | | |
|---|---|---|---|---|
| 1 | 00100324 | 23 | 29 | 19 |
| 2 | 20087604 | 28 | 41 | 78 |
| 3 | 84451821 | 42 | 36 | 65 |
| 4 | 01654847 | 55 | 67 | 100 |
| 5 | 88116140 | 72 | 52 | 4 |

PLy

| MINA NAKAJIMA'S RECOMMENDATIONS | | | | |
|---|---|---|---|---|
| http://www.***.jp/ | | | | |
| 1 | 60058138 | 30 | 51 | 24 |
| 2 | 15732268 | 50 | 46 | 39 |
| 3 | 00482478 | 59 | 50 | 92 |
| 4 | 37598108 | 72 | 70 | 71 |

SS　SP　EL　NE

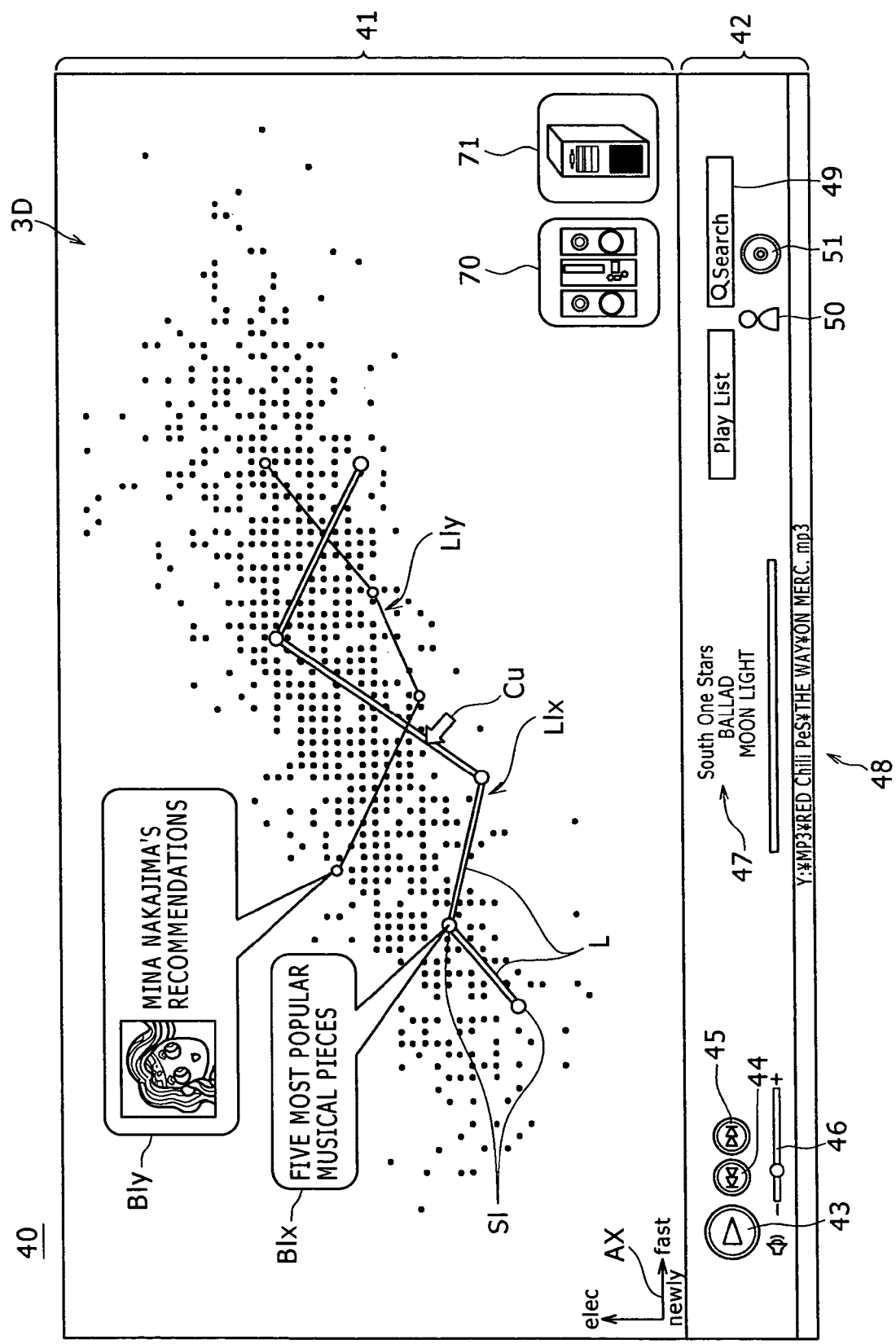

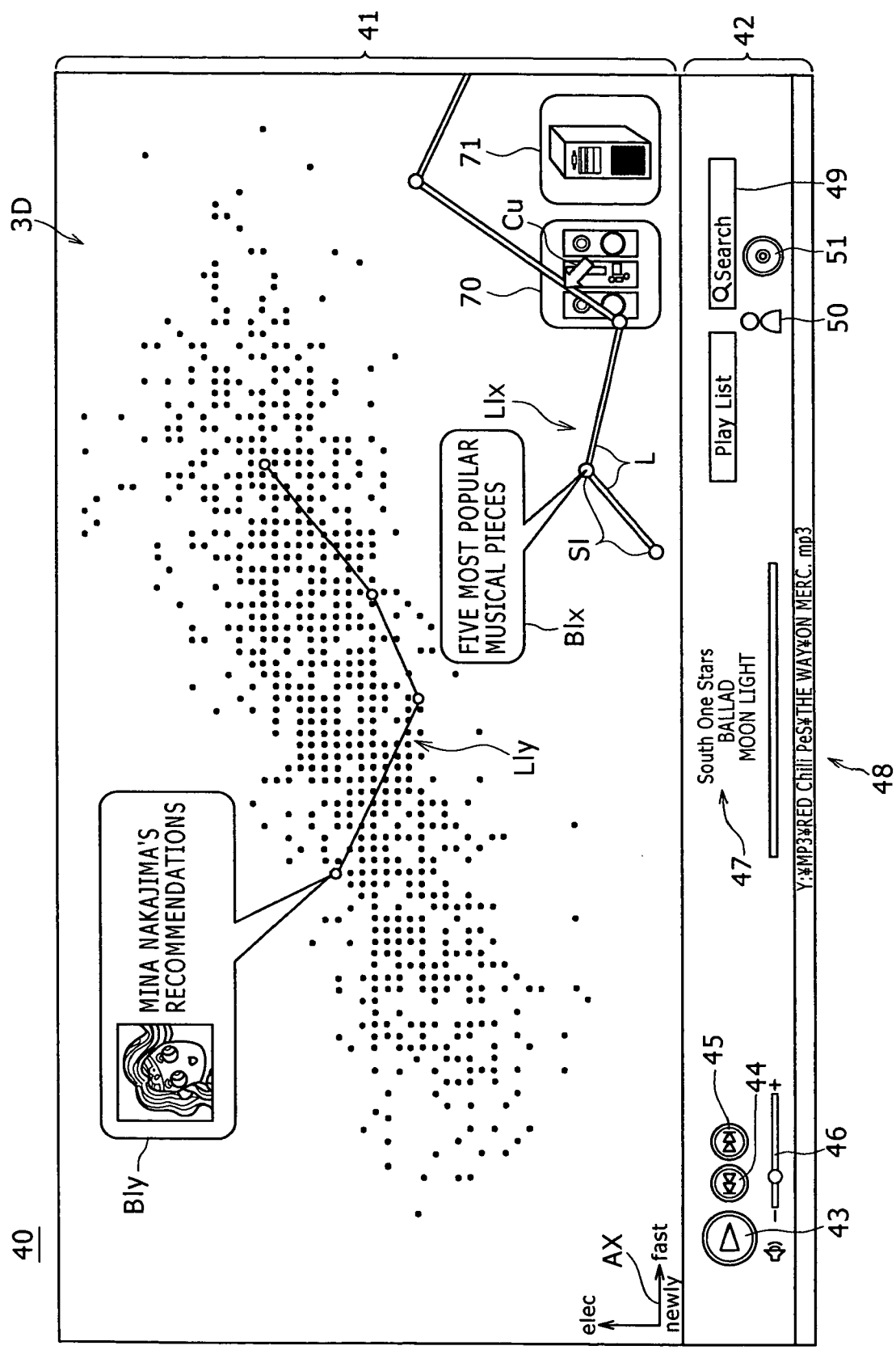

DISPLAY APPARATUS, DISPLAY METHOD, AND DISPLAY PROGRAM

CROSS REFERENCES TO RELATED APPLICATIONS

The present invention contains subject matter related to Japanese Patent Application JP 2006-014213, filed in the Japanese Patent Office on Jan. 23, 2006, the entire contents of which are incorporated herein by reference.

BACKGROUND OF THE INVENTION

1. Field of the Invention

The present invention relates to a display apparatus, a display method, and a display program, which, for example, can be suitably used when displaying a plurality of content indication marks corresponding to a plurality of contents.

2. Description of the Related Art

There has already been proposed a display apparatus that obtains, from a plurality of music contents, impression values (i.e., impressions of the music contents expressed in numerical form), converts each of the obtained impression values into plane coordinates, and displays a plane image containing content indication marks (e.g., dots) arranged at positions corresponding to the impressions of the respective music contents (see Japanese Patent Laid-open 2005-10771 (pages 14 and 15, FIG. 7), for example). Thus, this display apparatus presents to a user the plurality of music contents not in the form of character information (e.g., titles), but in the form of a collection of dots arranged at the positions corresponding to the impressions of the respective music contents. This enables the user to visually recognize the impression of each music content.

In addition, when one of the dots arranged in the plane image is selected, the display apparatus separately displays a title of a music content corresponding to the selected dot. Further, when two or more of the dots are selected, the display apparatus separately displays a list of titles of music contents corresponding to the selected two or more dots. In this list, the titles of the music contents are arranged in an arbitrary order (e.g., in an order in which the dots corresponding to the music contents were selected).

SUMMARY OF THE INVENTION

The above-described known display apparatus displays separately from each other the plane image containing the dots arranged at the positions corresponding to the impressions of the respective music contents and the list of the music contents corresponding to the dots selected on the plane image. Therefore, it is difficult for the user to recognize how the music contents corresponding to the selected dots have been listed only by viewing the plane image. Further, it is difficult for the user to recognize what impression each of the music contents included in the list gives only by viewing the list.

In other words, it is difficult for the user to recognize the impressions of the selected music contents and how the selected music contents are arranged in the list without associating the dots selected on the plane image with the music contents included in the list. That is, it is difficult for the user to easily recognize the impressions of the selected music contents and how the selected music contents are arranged in the list.

An advantage of the present invention is to provide a display apparatus, a display method, and a display program that enable a user to easily recognize impressions of selected contents and how the selected contents are arranged in a list.

According to one embodiment of the present invention, a display apparatus includes: a display control section configured to cause a display to display an image that contains a plurality of content indication marks each associated with a separate content, each of the plurality of content indication marks being arranged at a position corresponding to an impression of the content associated therewith; and a selection section configured to select two or more content indication marks from the plurality of content indication marks arranged in the image. When the two or more content indication marks are selected by the selection section, the display control section displays, on the image, a line segment or segments that join the selected two or more content indication marks so as to indicate an order in which the contents corresponding to the selected two or more content indication marks are arranged.

According to another embodiment of the present invention, a display method includes the steps of: causing a display to display an image that contains a plurality of content indication marks each associated with a separate content, each of the plurality of content indication marks being arranged at a position corresponding to an impression of the content associated therewith; selecting two or more content indication marks from the plurality of content indication marks arranged in the image; and displaying, on the image, a line segment or segments that join the two or more content indication marks selected in the selecting step so as to indicate an order in which the contents corresponding to the selected two or more content indication marks are arranged.

Yet another embodiment of the present invention includes a display program for causing an information processing apparatus to perform the steps of: causing a display to display an image that contains a plurality of content indication marks each associated with a separate content, each of the plurality of content indication marks being arranged at a position corresponding to an impression of the content associated therewith; selecting two or more content indication marks from the plurality of content indication marks arranged in the image; and displaying, on the image, a line segment or segments that join the two or more content indication marks selected in the selecting step so as to indicate an order in which the contents corresponding to the selected two or more content indication marks are arranged.

The above-described embodiments of the present invention enable a user to visually recognize, by the positions of the content indication marks arranged in the image, the impressions of the contents and, by the line segment or segments that join the selected two or more content indication marks together, the order in which the contents corresponding to the selected two or more content indication marks are arranged. Thus, the user is able to recognize, by viewing the single image, what impression each of the selected contents give and how the selected contents have been listed.

BRIEF DESCRIPTION OF THE DRAWINGS

FIG. 8 is an illustration showing structure (3) of the musical piece selection screen;

FIG. 9 is a diagram showing structure (1) of a playlist;

FIG. 11 is an illustration showing structure (5) of the musical piece selection screen;

FIGS. 12A and 12B are diagrams showing structure (2) of the playlist;

FIGS. 20A and 20B are diagrams showing structure (3) of the playlist;

FIG. 21 is an illustration showing structure (12) of the musical piece selection screen;

FIG. 22 is an illustration showing structure (13) of the musical piece selection screen;

DETAILED DESCRIPTION OF THE PREFERRED EMBODIMENTS

Hereinafter, embodiments of the present invention will be described in detail with reference to the accompanying drawings.

1. First Embodiment

1-1. Outline

First, with reference to FIG. 1, an outline of a first embodiment of the present invention will be described below. After the description of the outline, the first embodiment will be described specifically.

Figure 1:
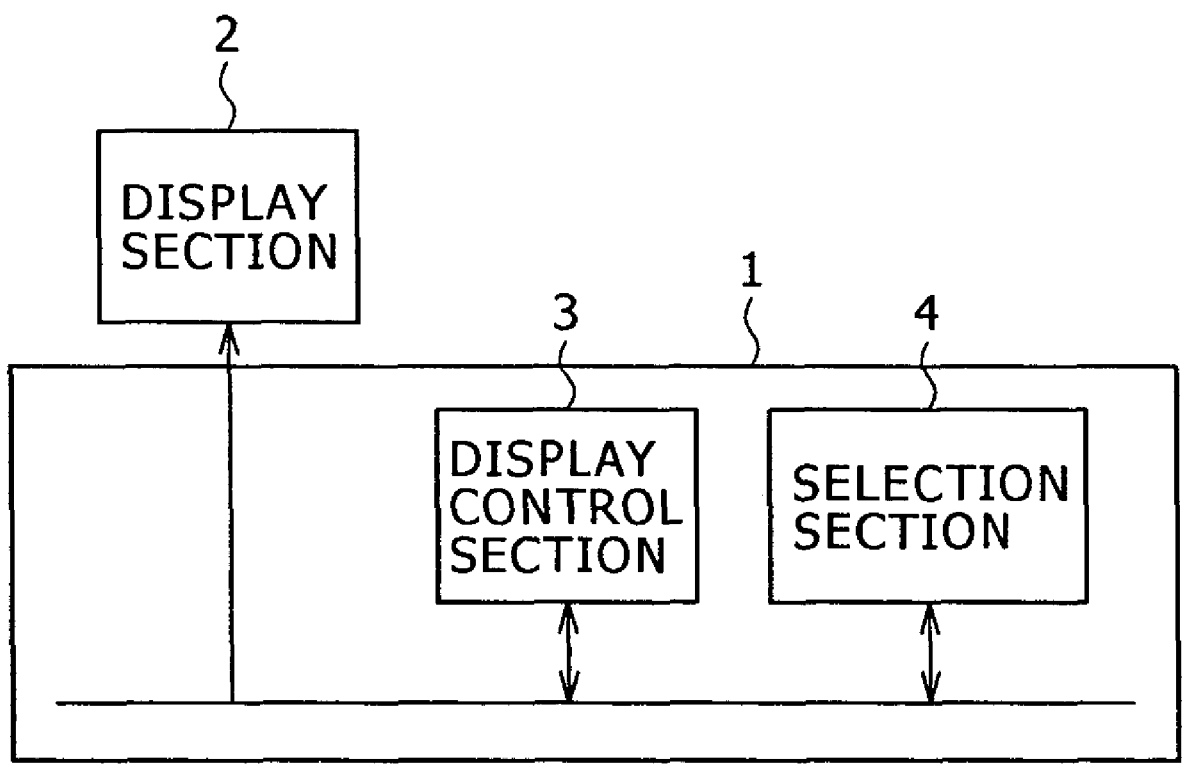
FIG. 1 is a block diagram illustrating an outline of a display apparatus according to one embodiment of the present invention.

A display apparatus 1, as illustrated in FIG. 1, includes a display control section 3. The display control section 3 causes a display section 2 to display an image containing a plurality of content indication marks. Each of the plurality of content indication marks is associated with a separate content and arranged at a position corresponding to an impression of the content associated therewith. The display apparatus 1 also includes a selection section 4 for selecting two or more content indication marks from the plurality of content indication marks arranged in the image. When two or more content indication marks are selected by the selection section 4, the display control section 3 displays on the image one or more line segments that join the selected two or more content indication marks so as to indicate an order in which contents corresponding to the selected two or more content indication marks are arranged.

Accordingly, the display apparatus 1 is capable of enabling a user to visually recognize the impressions of the contents based on the positions of the content indication marks arranged in the image. The display apparatus 1 is also capable of enabling a user to visually recognize the order in which the contents corresponding to the selected two or more content indication marks are arranged based on the line segment(s) that joins the selected two or more content indication marks together. Therefore, the display apparatus 1 is capable of enabling the user to recognize, by viewing the single image, what impressions the selected contents give and how the selected contents have been listed.

1-2. Structure of Recording and Reproducing Apparatus

Figure 2:
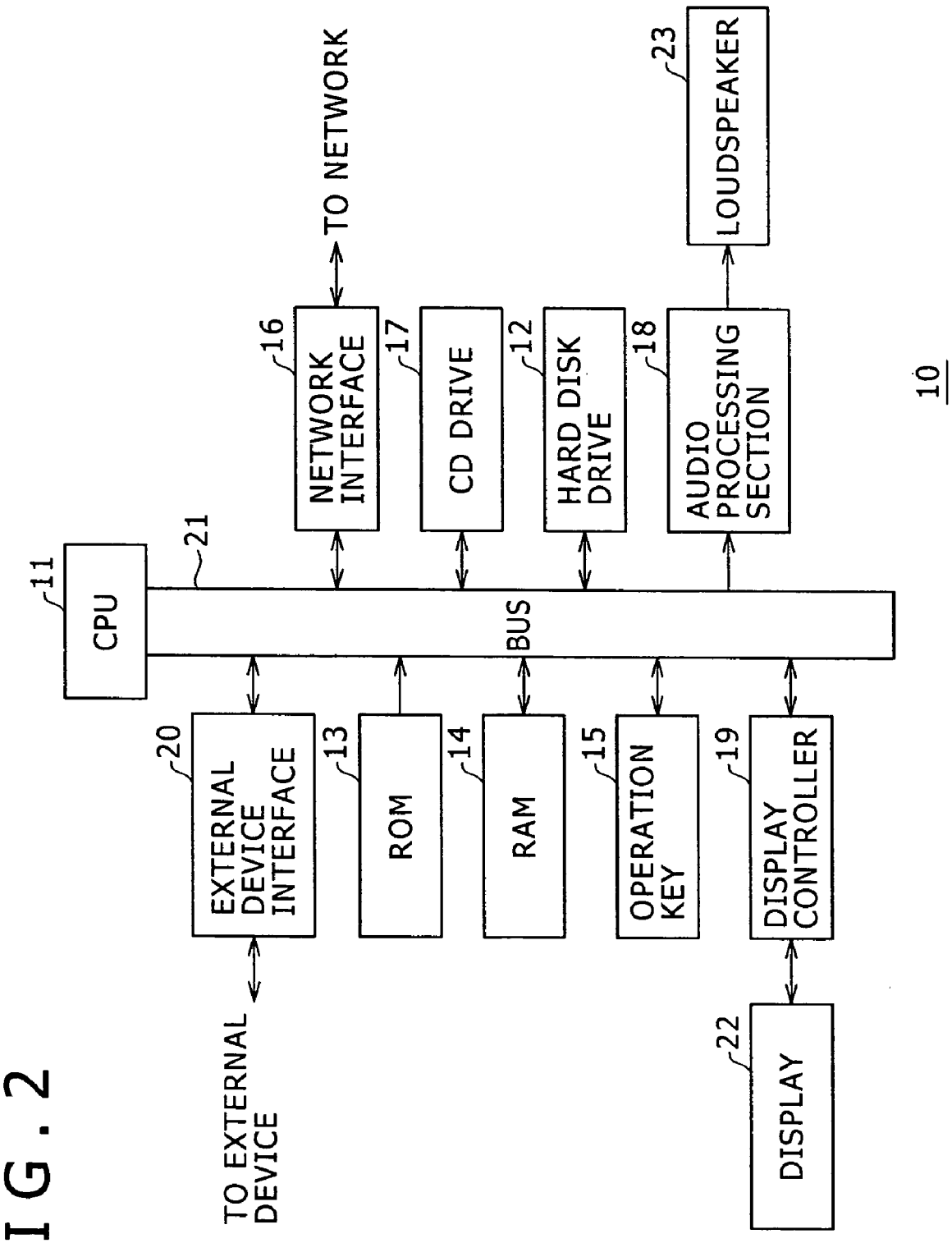
FIG. 2 is a block diagram illustrating a structure of a recording and reproducing apparatus.

Next, a recording and reproducing apparatus, which is a specific example to which the above-described display apparatus 1 is applied, will be described below with reference to FIG. 2. In FIG. 2, reference numeral 10 indicates a recording and reproducing apparatus that records and reproduces musical piece data. Recording and reproducing apparatus 10 includes a CPU (Central Processing Unit) 11, a hard disk drive 12, a ROM 13, a RAM 14, an operation key 15, a network interface 16, a CD (Compact Disc) drive 17, an audio processing section 18, a display controller 19, and an external device interface 20 connected to one another via a bus 21. Moreover, a display 22 is connected to the display controller 19, and a loudspeaker 23 is connected to the audio processing section 18. Note that the display 22 and the loudspeaker 23 may either be integral parts of the recording and reproducing apparatus 10 or separate, external devices connected to the recording and reproducing apparatus 10.

The CPU 11 exercises centralized control over the whole recording and reproducing apparatus 10 in accordance with a program read from the hard disk drive 12 or the ROM 13 and executes various processes. Data and a program used in the various processes are stored in the RAM 14 as necessary.

Specifically, when an instruction to acquire musical piece data to be delivered from a musical piece distribution server (not shown) on a network is issued by a user via the operation key 15, the CPU 11 transmits, to the musical piece distribution server via the network interface 16, a request signal for requesting delivery of the musical piece data. Then, the CPU 11 receives the musical piece data transmitted from the musical piece distribution server 11 in response to the request via the network interface 16, and records the received musical piece data on the hard disk drive 12. The musical piece distribution server delivers, to the recording and reproducing apparatus 10, musical piece-related information in addition to the requested musical piece data. The musical piece-related information includes a title of a musical piece based on the musical piece data, an artist name, a title of an album that contains the musical piece, a track number of the musical piece in the album, a position at which an image of a jacket of the album is stored, a genre name, a musical piece identifier unique to the musical piece data, and so on. Accordingly, when the delivery of the musical piece data by the musical piece distribution server is performed, the CPU 11 receives the musical piece-related information as well as the musical piece data via the network interface 16 and records them on the hard disk drive 12.

In addition, when an instruction is issued by the user, via the operation key 15, to record on the hard disk drive 12 musical piece data recorded on a CD mounted on the CD drive 17 the CPU 11 reads the musical piece data recorded in a musical piece data recording area of the CD via the CD drive 17 and records the read musical piece data on the hard disk drive 12. The CD includes a management data recording area in addition to the musical piece data recording area, and the management data recording area has recorded therein management data called TOC (Table Of Contents) that represents playing times and a playing order of pieces of musical piece data recorded in the musical piece data recording area. As such, the CPU 11 transmits the management data to a musical piece-related information providing server (not shown) on the network via the network interface 16, thereby acquiring from the musical piece-related information providing server the musical piece-related information related to the musical piece data recorded on the CD, and records the acquired musical piece-related information on the hard disk drive 12.

In the above-described manners, the recording and reproducing apparatus 10 acquires the musical piece data and the corresponding musical piece-related information from the musical piece distribution server, the musical piece-related information providing server, and/or the CD, and records and holds them in the hard disk drive 12.

Further, when an instruction is issued by the user, via the operation key 15, to reproduce the musical piece data recorded on the hard disk drive 12 the CPU 11 reads the musical piece data from the hard disk drive 12 and supplies the read musical piece data to the audio processing section 18. The audio processing section 18 subjects the supplied musical piece data to a digital process, such as decoding, and further subjects it to an analog process, such as digital to analog conversion and amplification, thereby obtaining an audio signal based on the musical piece data. The audio processing section 18 outputs a sound based on the audio signal via the loudspeaker 23. In this manner, the recording and reproducing apparatus 10 is also capable of reproducing the musical piece data recorded on the hard disk drive 12.

Still further, when an instruction is issued by the user, via the operation key 15, to transfer the musical piece data recorded on the hard disk drive 12 to an external device connected to the external device interface 20 the CPU 11 reads the musical piece data from the hard disk drive 12 and transfers the read musical piece data to the external device via the external device interface 20. In this manner, the recording and reproducing apparatus 10 is also capable of transferring the musical piece data recorded on the hard disk drive 12 to the external device connected to the external device interface 20.

Still further, the CPU 11 is also capable of displaying on the display 22 various GUI (Graphical User Interface) screens in relation to the acquisition, reproduction, recording, transferring, etc., of the musical piece data via the display controller 19.

In the recording and reproducing apparatus 10 according to the present embodiment, the CPU 11 is also capable of analyzing the musical piece data by frequency analysis or the like when recording the musical piece data on the hard disk drive 12. Based on a result of the analysis, the CPU 11 expresses, in numbers, an impression of each musical piece based on the musical piece data in terms of three items, such as a speed (i.e., tempo), a tone color, and a period, thereby obtaining first, second, and third impression item values.

Figures 3, 4:
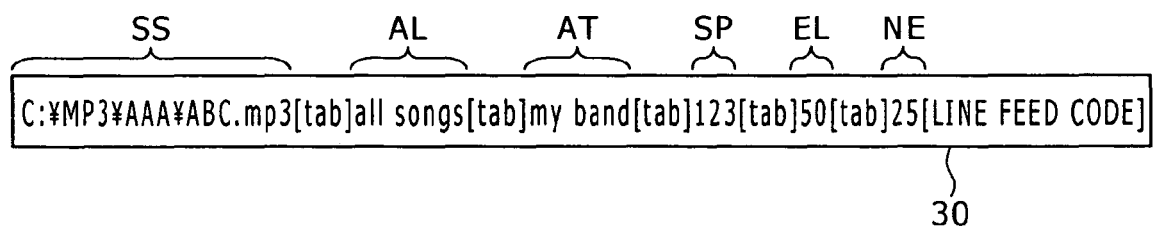
FIG. 3 is a diagram showing three items for expressing an impression of a musical piece.
FIG. 4 is a diagram illustrating a structure of musical piece analysis information.

Of the three items for expressing the impression of each musical piece, the item "speed" indicates where the musical piece is placed, in terms of speed, between two extremes, an impression of being slow and an impression of being fast, as illustrated in FIG. 3. The smaller the value thereof in numerical form (i.e., the first impression item value) is, the slower the impression of the corresponding musical piece is indicated. The larger the value is, the faster the impression of the corresponding musical piece is indicated. Further, of the three items, the item "tone color" indicates where the musical piece is placed, in terms of tone color, between two extremes, an impression of being "analog" and an impression of being "digital". The smaller the value thereof in numerical form (i.e., the second impression item value) is, the more "analog" the impression of the corresponding musical piece is indicated. The larger the value is, the more "digital" the impression of the corresponding musical piece is indicated. Still further, of the three items, the item "period" indicates where the musical piece is placed, in terms of period, between two extremes, an impression of being old and an impression of being new. The smaller the value thereof in numerical form (i.e., the third impression item value) is, the older the impression of the corresponding musical piece is indicated. The larger the value is, the newer the impression of the corresponding musical piece is indicated.

When the first, second, and third impression item values have been obtained, the CPU 11 uses the obtained first, second, and third impression item values and the musical piece-related information to generate musical piece analysis information 30 as illustrated in FIG. 4 with respect to each musical piece, and records the generated musical piece analysis information 30 on the hard disk drive 12. The musical piece analysis information 30 is composed of a musical piece identifier SS (e.g., "C:¥MP3¥AAA¥ABC.mp3") for identifying the musical piece data analyzed, a title AL (e.g., "all songs") of the album that contains the musical piece based on the analyzed musical piece data, an artist name AT (e.g., "my band"), the first impression item value SP (e.g., "123"), the second impression item value EL (e.g., "50"), and the third impression item value NE (e.g., "25"). In this example, a path indicating the position where the analyzed musical piece data is recorded is used as the musical piece identifier SS by way of example.

When an instruction is issued by the user, via the operation key 15, to display a musical piece selection screen (which will be described in detail later) for selecting a desired musical piece from the plurality of musical pieces recorded on the hard disk drive 12 the CPU 11 first reads all pieces of musical piece analysis information 30 recorded on the hard disk drive 12. Next, the CPU 11 converts a set of the first, second, and third impression item values SP, EL, and NE included in each of the pieces of musical piece analysis information 30 into three-dimensional coordinates with respect to a three-dimensional space with three coordinate axes (i.e., an x-axis, a y-axis, and a z-axis) perpendicular to one another and their intersection point (i.e., the origin) used as references. For example, regarding the set of the first, second, and third impression item values SP, EL, and NE, the CPU 11 assigns the first impression item value SP to the x-axis, the second impression item value EL to the y-axis, and the third impression item value NE to the z-axis.

Figure 5:
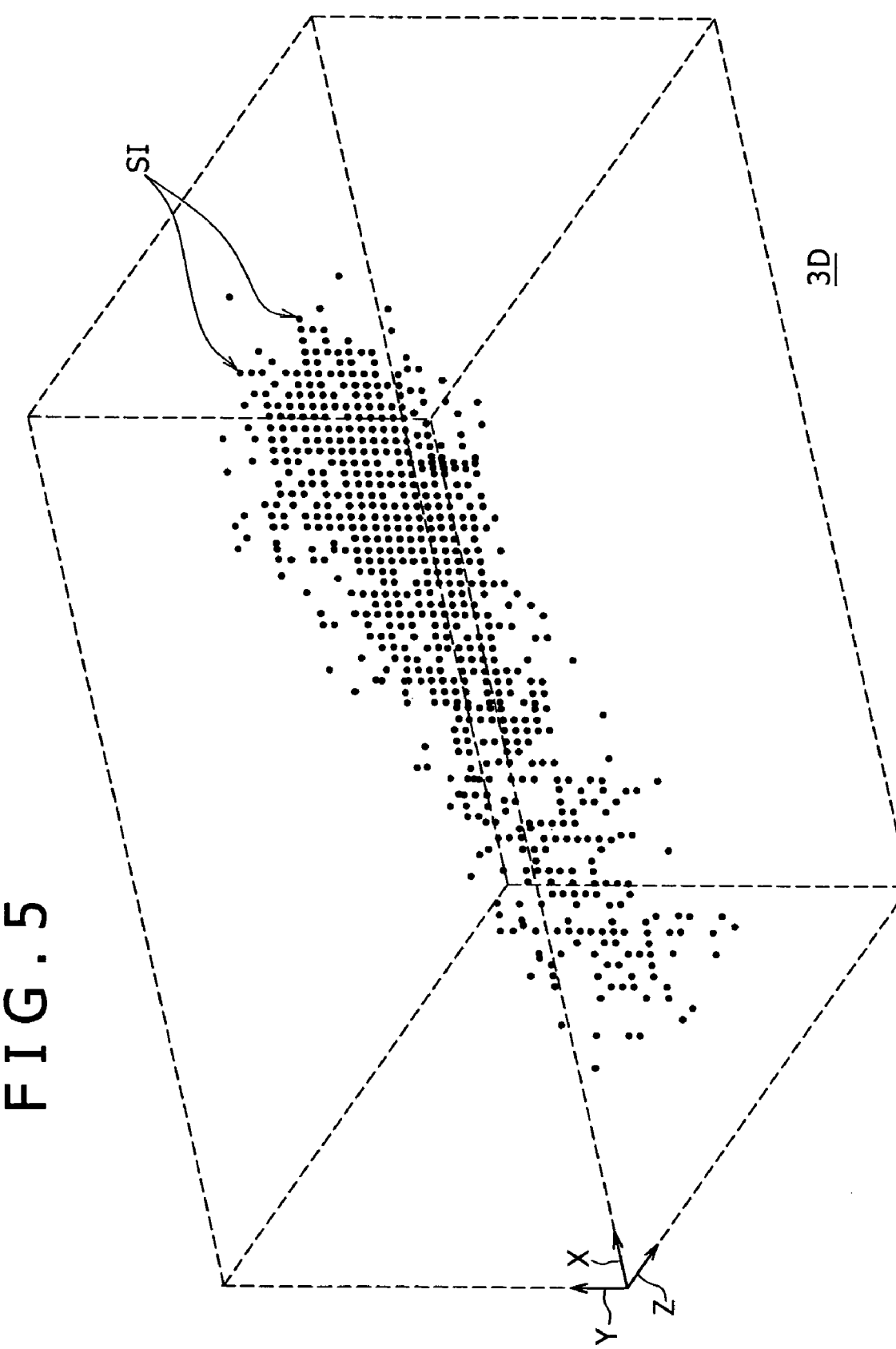
FIG. 5 is an illustration showing a structure of a three-dimensional image.

After obtaining the three-dimensional coordinates corresponding to each of all pieces of musical piece data recorded on the hard disk drive 12 based on each of all pieces of musical piece analysis information 30, the CPU 11 generates a three-dimensional image data representing a three-dimensional image 3D that contains dot-like musical piece indication marks SI each representing a separate one of the musical pieces. The musical piece indication marks SI are arranged at all of the obtained three-dimensional coordinates, as illustrated in FIG. 5.

In the three-dimensional image 3D represented by the three-dimensional image data, each musical piece indication mark SI is arranged at the three-dimensional coordinates defined by the first, second, and third impression item values SP, EL, and NE of the corresponding musical piece. Therefore, the position of the musical piece indication mark SI indicates the impression of the corresponding musical piece accurately so as to reflect all the three items. Accordingly, for example, if two musical piece indication marks SI are close to each other in the three-dimensional image 3D, it means that the impressions of two musical pieces corresponding to the two musical piece indication marks SI resemble each other. Meanwhile, if the positions of two musical piece indication marks SI are distant from each other, it means that the impressions of two musical pieces corresponding to the two musical piece indication marks SI do not resemble each other.

In the three-dimensional image 3D, the x-axis corresponds to the item "speed" among the three items for expressing the impression of the musical piece, the y-axis corresponds to the item "tone color" among the three items, and the z-axis corresponds to the item "period" among the three items. Therefore, the smaller an x-coordinate of the three-dimensional coordinates (i.e., the position of the musical piece indication mark SI) is, the slower the impression of the corresponding musical piece is indicated, whereas the larger the x-coordinate is, the faster the impression of the corresponding musical piece is indicated. Further, the smaller a y-coordinate is, the more the impression of "analog" the corresponding musical piece is indicated, whereas the larger the y-coordinate is, the more "digital" the impression of the corresponding musical piece is indicated. Still further, the smaller a z-coordinate is, the older the impression of the corresponding musical piece is indicated, whereas the larger the z-coordinate is, the newer the impression of the corresponding musical piece is indicated.

Figure 6:
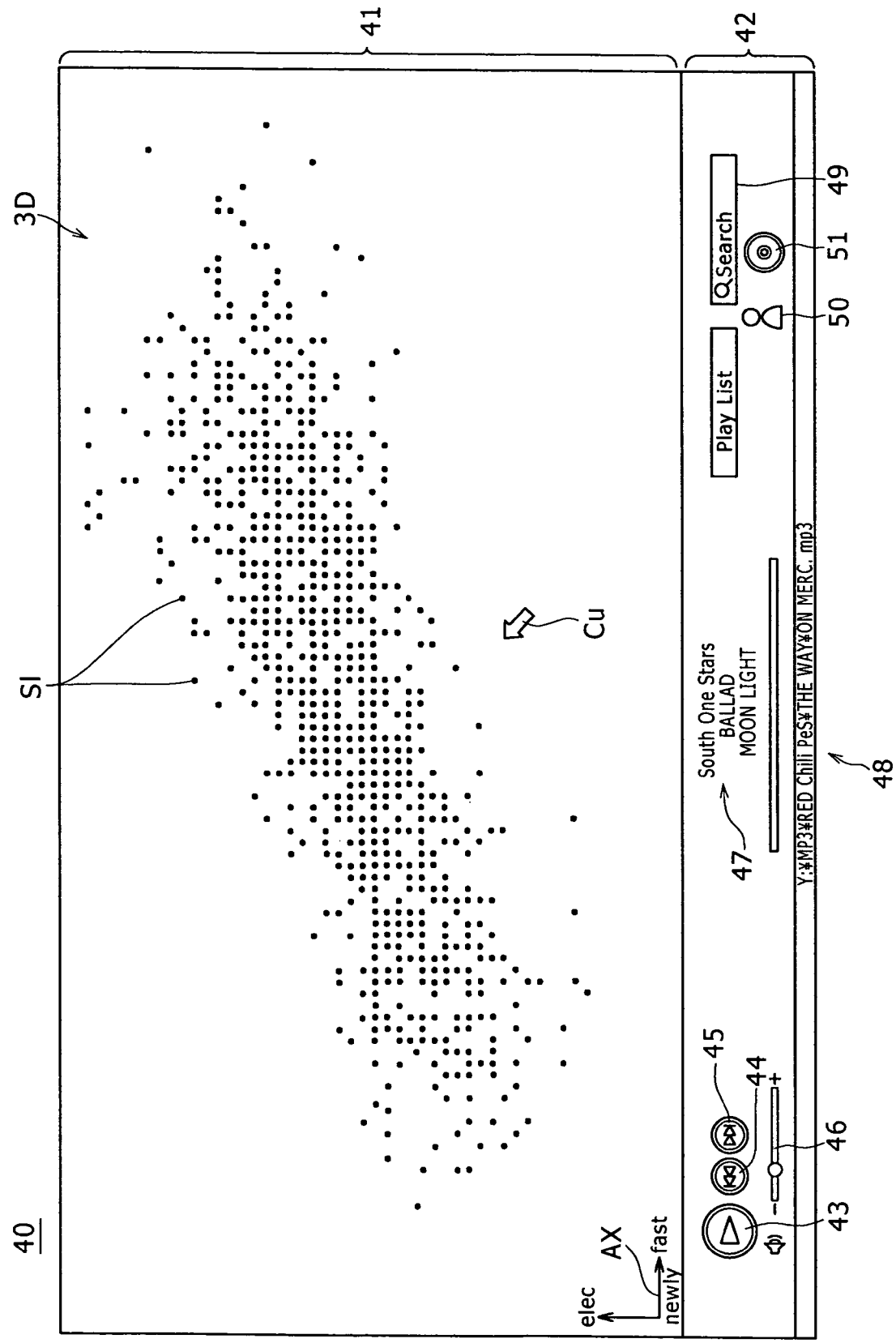
FIG. 6 is an illustration showing structure (1) of a musical piece selection screen.

After generating the three-dimensional image data representing the three-dimensional image 3D as described above, the CPU 11 generates musical piece selection screen data using the three-dimensional image data, and, as illustrated in FIG. 6, displays a musical piece selection screen 40 based on the generated musical piece selection screen data on the display 22 via the display controller 19.

The musical piece selection screen 40 is composed of a musical piece selection area 41 and an operation area 42. In the musical piece selection area 41, the three-dimensional image 3D based on the three-dimensional image data and an axes image AX indicating the coordinate axes of the three-dimensional image 3D are displayed. In addition, characters "fast" indicating the impression of being fast are displayed close to a tip of the x-axis of the axes image AX, characters "elec" indicating the impression of being "digital" are displayed close to a tip of the y-axis of the axes image AX, and characters "newly" indicating the impression of being new are displayed close to a tip of the z-axis of the axes image AX.

In practice, the CPU 11 converts the three-dimensional image 3D and the axes image AX into a two-dimensional image (which is, in this example, an xy-plane image) that is a projection thereof onto an xy-plane with a specified position (hereinafter referred to also as an "initial position") in a z-axis direction as a point of view, for example, and displays the two-dimensional image in the musical piece selection area 41. The state of the three-dimensional image 3D and the axes image AX as initially displayed in the musical piece selection area 41 will be referred to as an "initial display state".

For example, in the musical piece selection area 41 as illustrated in FIG. 6, the three-dimensional image 3D and the axes image AX, as converted into the xy-plane image with the x-axis for a transverse axis and the y-axis for a vertical axis, are displayed. As the display position of the musical piece indication mark SI approaches the right side of the musical piece selection area 41 (i.e., as the x-coordinate thereof increases), the corresponding musical piece gives an impression of being faster. As the display position of the musical piece indication mark SI approaches the upper side of the musical piece selection area 41 (i.e., as the y-coordinate thereof increases), the corresponding musical piece gives an impression of being more "digital".

In addition, an arrow cursor Cu for selecting any musical piece indication mark SI is displayed in the musical piece selection area 41 so as to be superimposed upon the three-dimensional image 3D. In the musical piece selection area 41, the arrow cursor Cu can be moved freely by operating the operation key 15. Any musical piece indication mark SI can be specified by placing an arrow tip of the arrow cursor Cu thereon. Further, it is possible to select any musical piece indication mark SI by pressing the operation key 15 when the arrow tip of the arrow cursor Cu is placed thereon.

In other words, in the musical piece selection area 41, orientations of the coordinate axes indicated by the displayed axes image AX visually indicate from what point of view (i.e., which position) the displayed three-dimensional image 3D is seen, and the characters displayed close to each axis of the axes image AX visually indicates what impression is given by a musical piece corresponding to each of the musical piece indication marks SI arranged in the three-dimensional image 3D. As a result, the user is able to easily select a musical piece that gives his or her desired impression.

Meanwhile, the operation area 42 is provided with: a Play button 43 for causing a musical piece associated with the selected musical piece indication mark SI to be played; a Previous button 44; a Next button 45; and a slide bar 46 for adjusting a volume of the musical piece. The operation area 42 is also provided with a "currently-played musical piece information display section" 47 for displaying, based on the musical piece-related information and the like, information (hereinafter referred to also as "currently-played musical piece information") of the musical piece that is being currently played. The "currently-played musical piece information" may include the title of the musical piece, the artist name, the title of the album that contains the musical piece, and/or the path of the musical piece. The operation area 42 is also provided with a "currently-specified musical piece information display section" 48 for displaying information (hereinafter referred to also as "currently-specified musical piece information") of the musical piece corresponding to the musical piece indication mark SI that is currently being specified by the arrow cursor Cu. The "currently-specified musical piece information" may include the title of the musical piece, the artist name, the title of the album containing the musical piece, and/or the path of the musical piece. The operation area 42 is also provided with a search condition input section 49 for inputting a search condition when searching for a musical piece(s); an artist-based classification button 50 (which will be described in detail later) for, in the case where a plurality of musical piece indication marks SI have been selected, for example, classifying them by artist name; and an album-based classification button 51 (which will be described in detail later) for classifying them by album title.

Figure 7:
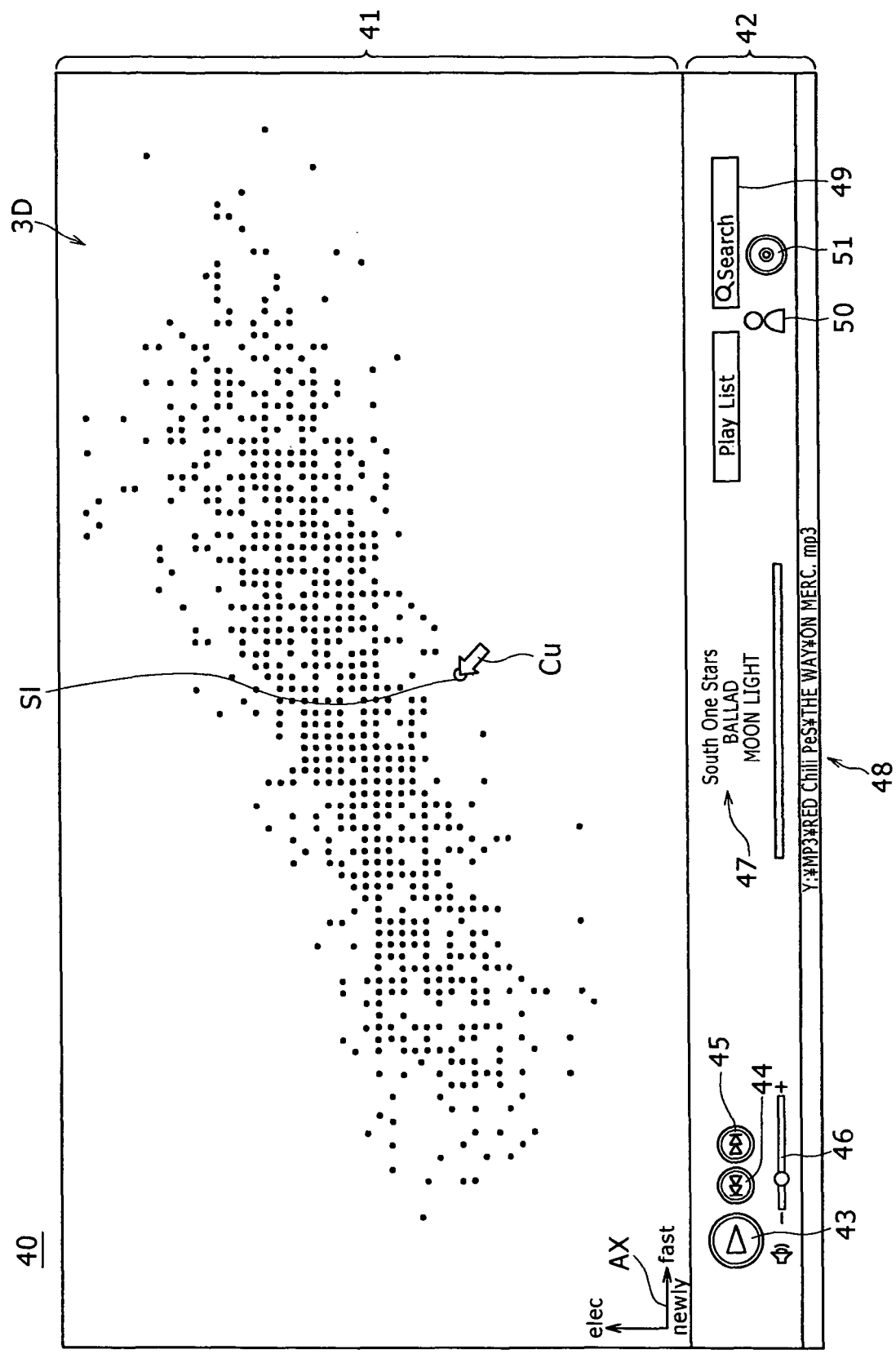
FIG. 7 is an illustration showing structure (2) of the musical piece selection screen.

If, after the musical piece selection screen 40 is displayed on the display 22, an instruction to move the arrow cursor Cu is issued by the user via the operation key 15, the CPU 11 causes the arrow cursor Cu to move within the musical piece selection area 41 in accordance with the instruction. If the arrow tip of the moving arrow cursor Cu overlaps any musical piece indication mark SI in the three-dimensional image 3D, the CPU 11 regards the musical piece indication mark SI being overlapped by the arrow tip of the arrow cursor Cu as being specified. In this case, as illustrated in FIG. 7, the CPU 11 magnifies the musical piece indication mark SI being specified to twice its original size, for example, changes a display color thereof from black to white, for example, and displays the currently-specified musical piece information corresponding to the musical piece indication mark SI being specified in the currently-specified musical piece information display section 48. If the arrow tip of the arrow cursor Cu leaves the musical piece indication mark SI being specified, the CPU 11 causes the musical piece indication mark SI to recover its original size and display color.

Further, if the operation key 15 is pressed when any musical piece indication mark SI is being specified (i.e., when any musical piece indication mark SI is in a magnified state and displayed in a different color), the CPU 11 regards this musical piece indication mark SI as having been selected. In this case, even if the arrow tip of the arrow cursor Cu leaves the selected musical piece indication mark SI, the CPU 11 does not cause the selected musical piece indication mark SI to recover its original size and display color. Still further, if the arrow tip of the arrow cursor Cu overlaps the selected musical piece indication mark SI again and the operation key 15 is pressed in this situation, the CPU 11 cancels the selection of the musical piece indication mark SI.

Still further, if the Play button 43 is activated via the operation key 15 when any musical piece indication mark SI is being selected, the CPU 11, in response to the activation of the Play button 43, displays the currently-played musical piece information corresponding to the selected musical piece indication mark SI in the currently-played musical piece information display section 47. The CPU 11, in response to activation of the play button 43, also reads the musical piece data associated with the selected musical piece indication mark SI from the hard disk drive 12 and reproduces the read musical piece data.

Still further, when an instruction to rotate the three-dimensional image 3D displayed in the musical piece selection area 41 (i.e., an instruction to move the point of view) is issued by the user via the operation key 15, the CPU 11, in accordance with the instruction, causes the point of view for the three-dimensional image 3D and the axes image AX to move from the initial position. As illustrated in FIG. 8, the CPU 11 converts the three-dimensional image 3D and the axes image AX into a new two-dimensional image as seen from a new point of view determined after the movement thereof and displays the new two-dimensional image in the musical piece selection area 41. As described above, the CPU 11 is capable of converting the three-dimensional image 3D to be displayed in the musical piece selection area 41 into a two-dimensional image as seen from an arbitrary point of view and presenting the two-dimensional image to the user for visual recognition.

Still further, if, after the point of view for the three-dimensional image 3D is moved, the user moves the arrow cursor Cu to overlap the axes image AX and selects the axes image AX via the operation key 15, for example, the CPU 11, in response to this operation, recovers the three-dimensional image 3D and the axes image AX to the initial display state as illustrated in FIG. 6.

Still further, when an instruction to magnify the three-dimensional image 3D is issued by the user via the operation key 15, the CPU 11, in accordance with the instruction, displays in the musical piece selection area 41 the three-dimensional image 3D as magnified at a specified degree of magnification with the position at which the tip of the arrow cursor Cu is placed for the center of magnification, for example. When an instruction to reduce the three-dimensional image 3D is issued, the CPU 11, in accordance with the instruction, displays in the musical piece selection area 41 the three-dimensional image 3D as reduced at a specified degree of reduction with the position at which the tip of the arrow cursor Cu is placed for the center of reduction, for example.

As described above, in the musical piece selection screen 40, any musical piece indication mark SI can be selected from the musical piece indication marks SI arranged in the three-dimensional image 3D at positions corresponding to the impressions of the respective corresponding musical pieces to reproduce the musical piece data associated with the selected musical piece indication mark SI. In other words, the recording and reproducing apparatus 10 is configured to enable the user to select, on the musical piece selection screen 40, a musical piece that gives his or her desired impression to enjoy reproduction of the selected musical piece.

1-3. List Image Display Function

A list image display function, when a plurality of musical piece indication marks SI are selected on the three-dimensional image 3D displayed in the musical piece selection area 41 of the musical piece selection screen 40 will now be described below. The function is for displaying an image (hereinafter referred to also as a "list image") that indicates an order in which a plurality of pieces of musical piece data, each associated with a separate one of the selected musical piece indication marks SI, are reproduced. For simplicity of description, the three-dimensional image 3D and the axes image AX displayed in the musical piece selection area 41 are assumed here to be in the initial display state (i.e., converted into the xy-plane image as seen from the initial position as the point of view) as illustrated in FIG. 6. In other words, in this case, as the display position of the musical piece indication mark SI approaches the right side of the musical piece selection area 41 (i.e., as the x-coordinate thereof increases), the corresponding musical piece gives an impression of being faster. As the display position of the musical piece indication mark SI approaches the upper side of the musical piece selection area 41 (i.e., the y-coordinate thereof increases), the corresponding musical piece gives an impression of being more "digital".

When the user enters characters "Mina Nakajima" representing an artist name in the search condition input section 49 and issues a search instruction using the operation key 15, for example, the CPU 11, in accordance with the instruction, searches for a piece(s) of musical piece data whose musical piece-related information contains "Mina Nakajima" as the artist name among the pieces of musical piece data recorded on the hard disk drive 12. Suppose, for example, that this search has found eight pieces of such musical piece data. In this case, based on the first, second, and third impression item values (i.e., the three-dimensional coordinates) contained in the musical piece analysis information 30 corresponding to each of the eight pieces of musical piece data found by the search, the CPU 11 selects eight musical piece indication marks $SI_1$ to $SI_8$, each corresponding to a separate one of the eight pieces of musical piece data. The CPU 11 selects the musical piece indication marks from the plurality of musical piece indication marks SI currently arranged in the three-dimensional image 3D in the initial display state displayed in the musical piece selection area 41.

Then, the CPU 11 generates a playlist PL in which the eight pieces of musical piece data corresponding to the selected eight musical piece indication marks $SI_1$ to $SI_8$ are arranged in ascending order of the first impression item value SP contained in the musical piece analysis information 30, as illustrated in FIG. 9, for example. In practice, in the playlist PL, the musical piece identifiers SS representing the pieces of musical piece data are shown in ascending order of the first impression item value SP. That is, in this case, at the top of the playlist PL is listed a musical piece identifier $SS_1$ that represents musical piece data whose first impression item value SP is the smallest of all, and the musical piece identifier $SS_1$ is followed by a musical piece identifier $SS_2$, a musical piece identifier $SS_3$, musical piece identifier $SS_4$, a musical piece identifier $SS_5$, a musical piece identifier $SS_G$, a musical piece identifier $SS_7$, and a musical piece identifier $SS_8$ in this order. Specifically, in the playlist PL is described the fact that the eight pieces of musical piece data whose artist name is "Mina Nakajima" are reproduced in ascending order of tempo.

Figure 10:
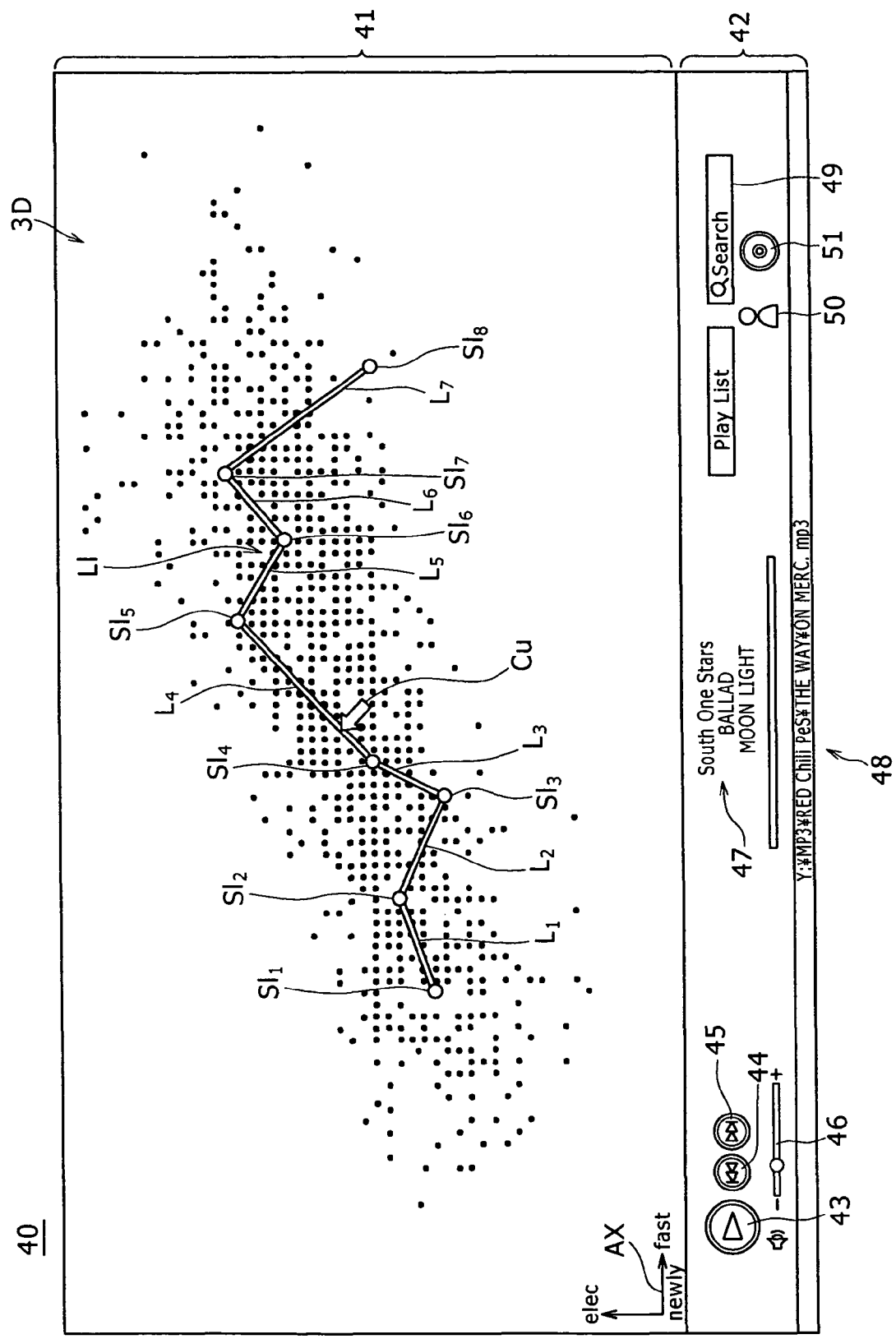
FIG. 10 is an illustration showing structure (4) of the musical piece selection screen.

In addition, as illustrated in FIG. 10, the CPU 11 also displays white straight lines L that join the selected eight musical piece indication marks $SI_1$ to $SI_8$ in ascending order of the first impression item value SP (i.e., the x-coordinate), i.e., in the order as indicated by the playlist PL. Specifically, in this case, a straight line $L_1$ that joins the musical piece indication marks $SI_1$ and $SI_2$ together, a straight line $L_2$ that joins the musical piece indication marks $SI_2$ and $SI_3$ together, a straight line $L_3$ that joins the musical piece indication marks $SI_3$ and $SI_4$ together, a straight line $L_4$ that joins the musical piece indication marks $SI_4$ and $SI_5$ together, a straight line $L_5$ that joins the musical piece indication marks $SI_5$ and $SI_6$ together, a straight line $L_6$ that joins the musical piece indication marks $SI_6$ and SI, together, and a straight line $L_7$ that joins the musical piece indication marks $SI_7$ and $SI_8$ are displayed in the musical piece selection area 41. The selected plurality of musical piece indication marks SI and the straight lines L that join them constitute the list image LI.

As described above, instead of displaying the order in which the pieces of musical piece data are reproduced as character information separately, the CPU 11 displays the order on the three-dimensional image 3D in the form of the list image LI. This enables the user to easily visually recognize, by viewing the three-dimensional image 3D, what impressions the selected musical pieces give and in what order they are reproduced.

Further, if the Play button 43 is activated when the list image LI is being displayed as described above, the CPU 11, in response thereto, reads the musical piece data corresponding to the musical piece indication mark $SI_1$ whose first impression item value SP (i.e., the x-coordinate) is the smallest (i.e., the musical piece data listed at the top of the playlist PL) and starts reproducing the read musical piece data. After the reproduction of this musical piece data is completed, the CPU 11 proceeds to start reproducing the musical piece data corresponding to the musical piece indication mark $SI_2$ whose x-coordinate is the second smallest of those of the selected musical piece indication marks $SI_1$ to $SI_8$. Thereafter, in this manner, the CPU 11 reproduces the pieces of musical piece data corresponding to the musical piece indication marks $SI_3$, $SI_4$, $SI_6$, $SI_6$, $SI_7$, and $SI_8$ in ascending order of the x-coordinate (i.e., in the order as indicated by the playlist, or in the order in which they are arranged along the straight lines L).

At the time of the reproduction of the musical piece data, as illustrated in FIG. 11, the CPU 11 also changes, in the list image LI, the color of the musical piece indication mark(s) SI corresponding to the musical piece data the reproduction of which has already been completed (e.g., from white to red), and also changes the shape of the musical piece indication mark SI corresponding to the musical piece data that is currently being reproduced (e.g., from a circle to a star shape). In practice, in the example as illustrated in FIG. 11, the musical piece data associated with the musical piece indication mark $SI_2$ is currently being reproduced, and accordingly, the shape of the musical piece indication mark $SI_2$ corresponding to the currently-reproduced musical piece data has been changed from the circle to the star shape. The color of the musical piece indication mark $SI_1$ corresponding to the musical piece data for which reproduction has already been completed has been changed from white to red. In this manner, the CPU 11 enables the user to easily recognize, by viewing the list image LI, which musical piece data is currently being reproduced, which musical piece data has already been reproduced, and which musical piece data is yet to be reproduced.

Further, the CPU 11 changes the color of the straight lines L that join the musical piece indication marks SI continuously from a start point toward an end point of the straight lines L (e.g., from white to red) in accordance with a current reproduction position of the musical piece data. In practice, the exemplary display as illustrated in FIG. 11 is a display presented at a time when approximately a third of the musical piece data corresponding to the musical piece indication mark $SI_2$ has been reproduced. Accordingly, the color of the first third of the straight line $L_2$ that joins the musical piece indication mark $SI_2$, (corresponding to the musical piece data that is being currently reproduced) and the musical piece indication mark $SI_2$, (corresponding to the musical piece data that will be reproduced next) has been changed from white to red. The color of the straight line $L_1$ that joins the musical piece indication mark $SI_1$ corresponding to the musical piece data that has already been reproduced and the musical piece indication mark $SI_2$ corresponding to the musical piece data that is currently being reproduced has been changed from white to red in its entirety (i.e., from the start point to the end point thereof). In this manner, the CPU 11 enables the user to easily recognize, by viewing the list image LI, the current reproduction position of the musical piece data that is currently being reproduced.

In addition, if the album-based classification button 51 is activated when the list image LI is being displayed (i.e., when the musical piece selection area 41 is in a state as illustrated in FIG. 10 or FIG. 11), the CPU 11, in response to the activation of the album-based classification button 51, classifies the plurality of pieces of musical piece data corresponding to the musical piece indication marks SI on the list image LI on an album by album basis. The CPU 11 also generates a playlist PL for each album and displays a list image LI for each album.

Specifically, based on the musical piece-related information, the CPU 11 first classifies the eight pieces of musical piece data (which are, in the present example, the eight pieces of musical piece data whose artist name is "Mina Nakajima") corresponding to the eight musical piece indication marks SI on the list image LI on an album by album basis. Suppose that, as a result of the classification, the eight pieces of musical piece data have been classified into a group of four pieces of musical piece data whose album title is "MIDDLE ISLAND" and a group of four pieces of musical piece data whose album title is "HALLO," for example. In this case, the CPU 11 generates a playlist $PL_1$ (as illustrated in FIG. 12A) that contains the four pieces of musical piece data whose album title is "MIDDLE ISLAND" arranged in ascending order of the first impression item value SP contained in the musical piece analysis information 30, and also generates a playlist $PL_2$ (as illustrated in FIG. 12B) that contains the four pieces of musical piece data whose album title is "HALLO" arranged in ascending order of the first impression item value SP.

That is, at the top of the playlist $PL_1$ in this case is listed the musical piece identifier $SS_1$ that represents the musical piece data whose first impression item value SP is the smallest of all of those of the four pieces of musical piece data whose album title is "MIDDLE ISLAND," and the musical piece identifier $SS_1$ is followed by the musical piece identifier $SS_2$, the musical piece identifier $SS_3$, and the musical piece identifier $SS_8$ in this order. Specifically, in the playlist $PL_1$ is described the fact that the four pieces of musical piece data whose artist name is "Mina Nakajima" and whose album title is "MIDDLE ISLAND" are reproduced in ascending order of tempo. Meanwhile, at the top of the playlist $PL_2$ in this case is listed the musical piece identifier $SS_4$ that represents the musical piece data whose first impression item value SP is the smallest of all of those of the four pieces of musical piece data whose album title is "HALLO," and the musical piece identifier $SS_4$ is followed by the musical piece identifier $SS_5$, the musical piece identifier $SS_6$, and the musical piece identifier $SS_7$ in this order. Specifically, in the playlist $PL_2$ is described the fact that the four pieces of musical piece data whose artist name is "Mina Nakajima" and whose album title is "HALLO" are reproduced in ascending order of tempo.

Figure 13:
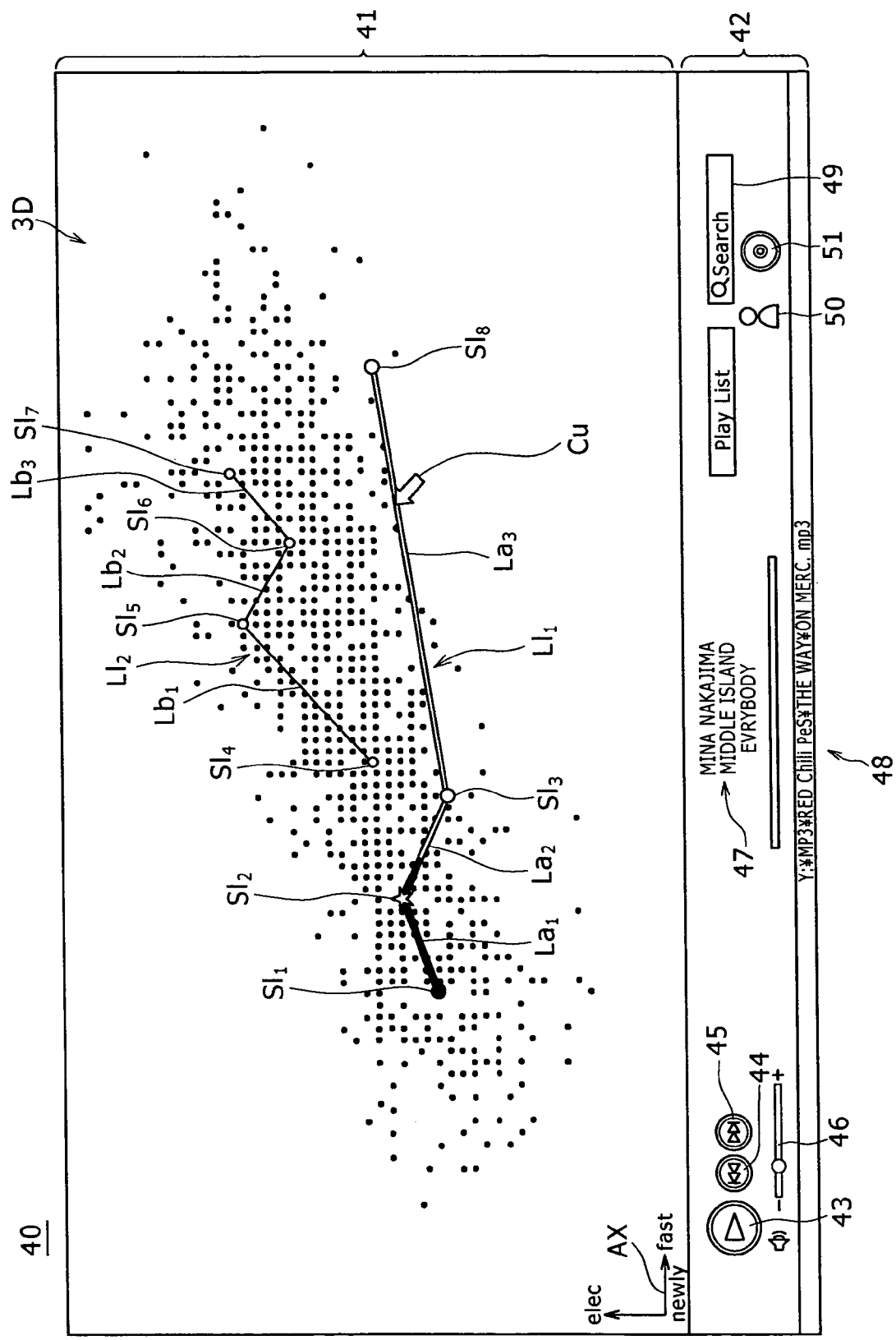
FIG. 13 is an illustration showing structure (6) of the musical piece selection screen.

In addition, as illustrated in FIG. 13, the CPU 11 displays a list image $LI_1$ and a list image $LI_2$ in place of the list image LI. The list image $LI_1$ is composed of straight lines La that join the musical piece indication marks $SI_1$, $SI_2$, $SI_3$, and $SI_s$ corresponding to the four pieces of musical piece data whose album title is "MIDDLE ISLAND" in ascending order of the x-coordinate (i.e., the first impression item value SP), i.e., in the order indicated by the playlist $PL_1$. The list image $LI_2$ is composed of straight lines Lb that join the musical piece indication marks $SI_4$, $SI_5$, $SI_6$, and $SI_7$ corresponding to the four pieces of musical piece data whose album title is "HALLO" in ascending order of the x-coordinate (i.e., the first impression item value SP), i.e., in the order indicated by the playlist $PL_2$. That is, in this case, the list image $LI_1$ is composed of a straight line $La_1$ that joins the musical piece indication marks $SI_1$ and $SI_2$ together, a straight line $La_2$ that joins the musical piece indication marks $SI_2$ and $SI_3$ together, and a straight line $La_1$ that joins the musical piece indication marks $SI_3$ and $SI_8$ together. The list image $LI_2$ is composed of a straight line $Lb_1$ that joins the musical piece indication marks $SI_4$ and $SI_5$ together, a straight line $Lb_2$ that joins the musical piece indication marks $SI_5$ and $SI_6$ together, and a straight line $Lb_3$ that joins the musical piece indication marks $SI_6$ and $SI_7$ together.

The CPU 11 displays the list image $LI_1$ that has been selected by the arrow cursor Cu and the list image $LI_2$ that has not been selected at different degrees of magnification, for example, thereby enabling the user to easily visually recognize, when a plurality of list images LI are being displayed, which one of the list images LI is currently selected. In the exemplary display as illustrated in FIG. 13, the list image $LI_2$, which is not currently selected, is shown at half a degree of magnification at which the list image $LI_1$, which is currently selected, is shown.

Suppose here that after the plurality of pieces of musical piece data corresponding to the musical piece indication marks SI on the list image LI are classified on an album by album basis and the list images $LI_1$ and $LI_2$, each for a separate album, are displayed in place of the list image LI as described above, the artist-based classification button 50 is activated. In this case, since the artist name of all of the eight pieces of musical piece data corresponding to the eight musical piece indication marks SI on the list images $LI_1$ and $LI_2$ is "Mina Nakajima", the CPU 11 generates again the playlist PL that describes the fact that the eight pieces of musical piece data whose artist name is "Mina Nakajima" are reproduced in ascending order of tempo as illustrated in FIG. 9, and displays the list image LI as illustrated in FIG. 10 in place of the list images $LI_1$ and $LI_2$.

As described above, the CPU 11 does not only generate the single playlist PL that contains all of the plurality of pieces of musical piece data corresponding to the plurality of musical piece indication marks SI selected in accordance with a user operation and display the single list image LI, but is also capable of classifying the plurality of pieces of musical piece data based on the musical piece-related information, such as the album title. The CPU 11 is also capable of generating the playlists PL for the pieces of musical piece data on a group by group basis and displaying the list image LI for each group.

1-4. List Image Display Procedure

Figure 14:
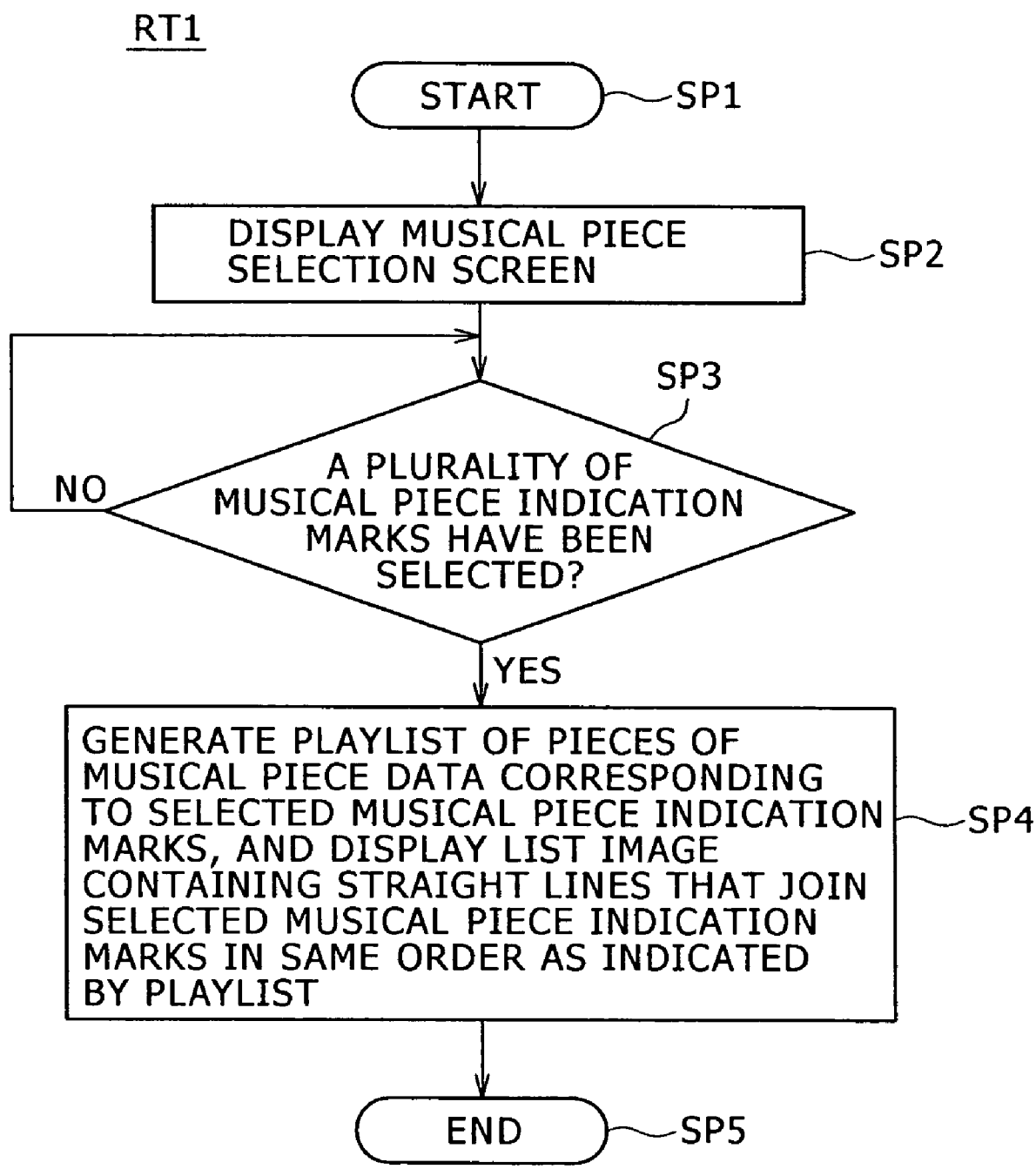
FIG. 14 is a flowchart illustrating a list image display procedure.

Next, a procedure for displaying the above-described list image will be described below with reference to a flowchart of FIG. 14. This list image display procedure is performed by the CPU 11 of the recording and reproducing apparatus 10 in accordance with the program read from the hard disk drive 12 or the ROM 13.

When the instruction to display the musical piece selection screen 40 is issued by the user via the operation key 15, the CPU 11 of the recording and reproducing apparatus 10 starts a list image display procedure RT1 with a starting step SP1, and proceeds to the next step SP2. At step SP2, the CPU 11 displays the musical piece selection screen 40 as illustrated in FIG. 6 on the display 22, and proceeds to the next step SP3. At this time, as described above, the three-dimensional image 3D containing the plurality of musical piece indication marks SI arranged at the positions corresponding to the impressions of the respective corresponding musical pieces is displayed in the musical piece selection area 41 of the musical piece selection screen 40.

At step SP3, the CPU 11 waits for at least two musical piece indication marks SI to be selected from the plurality of musical piece indication marks SI arranged in the three-dimensional image 3D in accordance with a user operation, and, if at least two musical piece indication marks SI are selected, proceeds to the next step SP4. Examples of the method for selecting at least two musical piece indication marks SI in accordance with the user operation include, as described above, a method of selecting the musical piece indication marks SI corresponding to the plurality of pieces of musical piece data found by search and a method of placing the arrow cursor Cu on the musical piece indication marks SI and selecting them directly.

At step SP4, the CPU 11 generates the playlist PL containing the plurality of pieces of musical piece data corresponding to the selected musical piece indication marks SI arranged in ascending order of the first impression item value SP in the musical piece analysis information 30, and also displays, on the three-dimensional image 3D, the list image LI containing the straight lines L that join the selected musical piece indication marks SI in ascending order of the x-coordinate (i.e., the first impression item value SP), i.e., in the order indicated by the playlist PL. Then, control proceeds to an end step SP5, thereby finishing the list image display procedure RT1.

The CPU 11 of the recording and reproducing apparatus 10 is configured to display the list image LI according to the above-described procedure.

1-5. Operation and Effects of First Embodiment

Based on a plurality of pieces of musical piece data recorded on the hard disk drive 12 and a plurality of pieces of musical piece analysis information 30, that are each associated with a separate one of the plurality of pieces of musical piece data and that each indicate the impression of the musical piece based on the corresponding piece of musical piece data, the recording and reproducing apparatus 10 according to the first embodiment displays on the display 22 the three-dimensional image 3D. The three-dimensional image 3D contains a plurality of musical piece indication marks SI each corresponding to a separate one of the plurality of pieces of musical piece data. Each musical piece indication mark SI is arranged at a position corresponding to the impression of the corresponding musical piece.

Then, when at least two musical piece indication marks SI are selected from the plurality of musical piece indication marks SI arranged in the three-dimensional image 3D in accordance with a user operation or the like, the recording and reproducing apparatus 10 generates the playlist PL containing a plurality of pieces of musical piece data corresponding to the selected musical piece indication marks SI. The pieces of musical piece data are arranged in the playlist PL in an order based on a specified condition. In addition, the recording and reproducing apparatus 10 displays, on the three-dimensional image 3D, the list image LI containing the straight lines L that join the selected musical piece indication marks SI. In this way, the selected musical piece indication marks SI are arranged on the straight lines L in the same order as indicated by the generated playlist PL.

In this manner, the recording and reproducing apparatus 10 enables the user to visually recognize, by the positions of the musical piece indication marks SI contained in the list image LI displayed on the three-dimensional image 3D, the impression of each of the plurality of musical pieces corresponding to the selected musical piece indication marks SI. In addition, the recording and reproducing apparatus 10 enables the user to visually recognize, by the straight line(s) L contained in the list image LI, in what order the musical pieces corresponding to the selected musical piece indication marks SI are reproduced, i.e., how they have been listed.

According to the first embodiment, if, after the three-dimensional image 3D-containing the plurality of musical piece indication marks SI that are each associated with a separate one of the plurality of pieces of musical piece data and that are each arranged at the position corresponding to the impression of the musical piece based on the corresponding piece of musical piece data-is displayed, at least two musical piece indication marks SI are selected from the plurality of musical piece indication marks SI arranged in the three-dimensional image 3D, the straight line(s) L that join the selected musical piece indication marks SI are displayed on the three-dimensional image 3D so as to indicate the order in which the pieces of musical piece data corresponding to the selected musical piece indication marks SI, are arranged.

Accordingly, the user is able to visually recognize, by the positions of the musical piece indication marks SI arranged in the three-dimensional image 3D, the impressions of the musical pieces and also visually recognize, by the straight line(s) L that join the selected musical piece indication marks SI together, the order in which the pieces of musical piece data corresponding to the selected musical piece indication marks SI are arranged. Therefore, the user is able to recognize, by viewing the three-dimensional image 3D, what impressions the musical pieces corresponding to the selected pieces of musical piece data give and how they have been listed. That is, a display apparatus, a display method, and a display program which enable the user to easily recognize what impressions the selected contents give and how they have been listed are achieved.

2. Second Embodiment

Next, a second embodiment of the present invention will be described below. In the second embodiment, the recording and reproducing apparatus 10 has a list transfer function of transferring the playlist PL to an external device connected to the external device interface 20, in addition to the functions described above with respect to the first embodiment.

2-1. List Transfer Function

Figure 15:
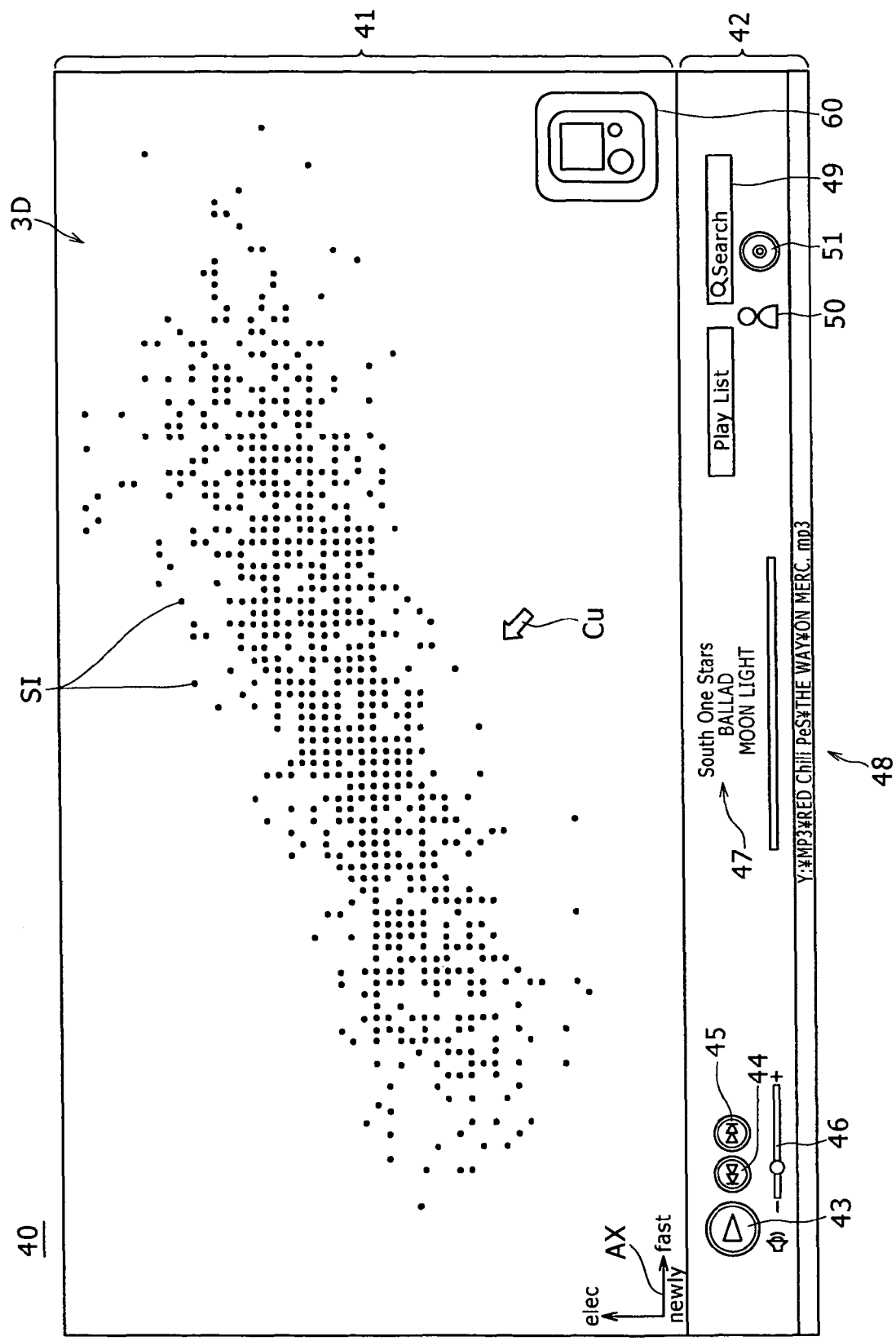
FIG. 15 is an illustration showing structure (7) of the musical piece selection screen.

In practice, when an external device that is a destination of transfer of the playlist PL is connected to the external device interface 20, the CPU 11 of the recording and reproducing apparatus 10 displays, as illustrated in the musical piece selection screen 40 of FIG. 15, a transfer destination icon 60 representing the external device that is the transfer destination within the musical piece selection area 41. In the musical piece selection area 41, the three-dimensional image 3D and the axes image AX are also displayed.

In this manner, the CPU 11 enables the user to visually recognize, by viewing the musical piece selection screen 40, that the external device that is the destination of transfer of the playlist PL is connected to the recording and reproducing apparatus 10.

Figure 16:
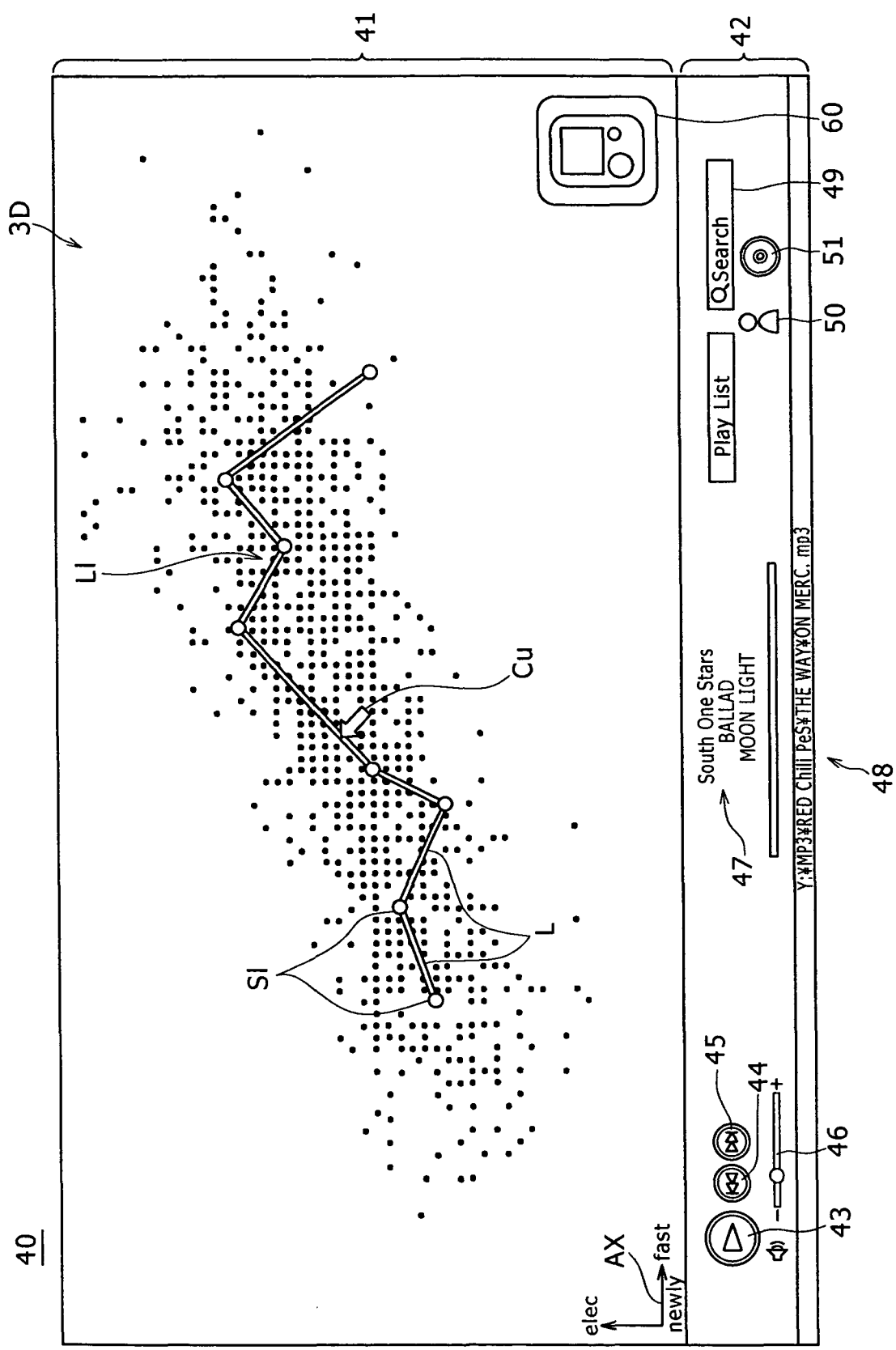
FIG. 16 is an illustration showing structure (8) of the musical piece selection screen.

As in the above-described first embodiment, when at least two musical piece indication marks SI are selected from the plurality of musical piece indication marks SI arranged in the three-dimensional image 3D in accordance with a user operation or the like, the CPU 11 generates the playlist PL (see FIG. 9) containing the plurality of pieces of musical piece data corresponding to the selected musical piece indication marks SI. The plurality of pieces of musical piece data are arranged in the playlist PL in ascending order of the first impression item value SP. In addition, as illustrated in the musical piece selection screen 40 of FIG. 16, the CPU 11 displays, on the three-dimensional image 3D within the musical piece selection area 41, the list image LI containing the straight lines L that join the selected musical piece indication marks SI in the same order as indicated by the generated playlist PL.

Figure 17:
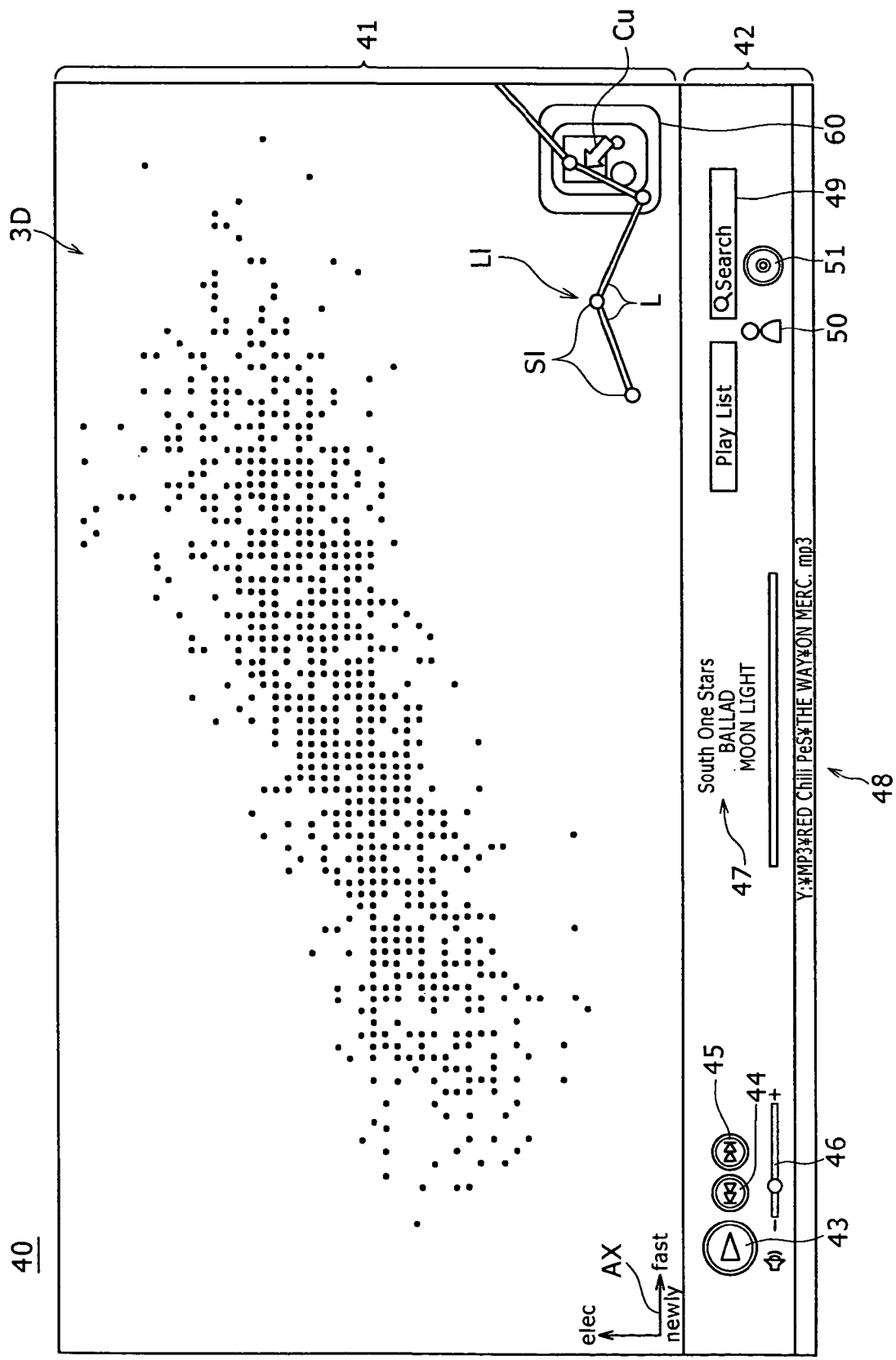
FIG. 17 is an illustration showing structure (9) of the musical piece selection screen.

If, after the list image LI is displayed in the above-described manner, the arrow cursor Cu is placed upon the list image LI and then, with the operation key 15 being held down, the arrow cursor Cu is moved in accordance with a user operation (i.e., a so-called drag operation), the CPU 11 causes the list image LI to move in accordance with the movement of the arrow cursor Cu. Then, if the list image LI is dragged onto the transfer destination icon 60 and the operation key 15 is released (i.e., a so-called drop operation) as illustrated in FIG. 17, the CPU 11 determines that an instruction to transfer the playlist PL corresponding to the list image LI to the external device represented by the transfer destination icon 60 has been issued, and starts transferring the playlist PL to the external device.

In practice, when transferring the playlist PL, the CPU 11 first checks whether each of the plurality of pieces of musical piece data listed in the playlist PL is stored in the external device. For example, suppose that the eight musical piece identifiers $SS_1$ to $SS_8$ representing the eight pieces of musical piece data are listed in the playlist PL as illustrated in FIG. 9. In addition, the CPU 11 recognizes that the two pieces of musical piece data identified by the musical piece identifiers $SS_1$ and $SS_3$ are stored in the external device, while the six pieces of musical piece data identified by the remaining six musical piece identifiers $SS_2$, $SS_4$, $SS_5$, $SS_6$, $SS_7$, and $SS_8$ are not stored in the external device.

In this case, the CPU 11 recognizes the six pieces of musical piece data identified by the musical piece identifiers $SS_2$, $SS_4$, $SS_5$, $SS_6$, $SS_7$, and $SS_8$ as pieces of musical piece data to be transferred to the external device along with the playlist PL. The CPU 11 replaces the musical piece identifiers $SS_1$ and $SS_3$ in the playlist PL with paths that indicate positions at which the respective corresponding pieces of musical piece data are stored in the external device and replaces the remaining musical piece identifiers $SS_2$, $SS_4$, $SS_5$, $SS_6$, $SS_7$, and $SS_8$ with paths that indicate positions at which the respective corresponding pieces of musical piece data to be transferred will be stored in the external device. That is, the CPU 11 modifies the playlist PL so that it can be used, as it is, in the external device to which it is transferred.

Then, the CPU 11 transfers to the external device the modified playlist PL and the pieces of musical piece data that are listed in the playlist PL but not stored in the external device.

Figure 18:
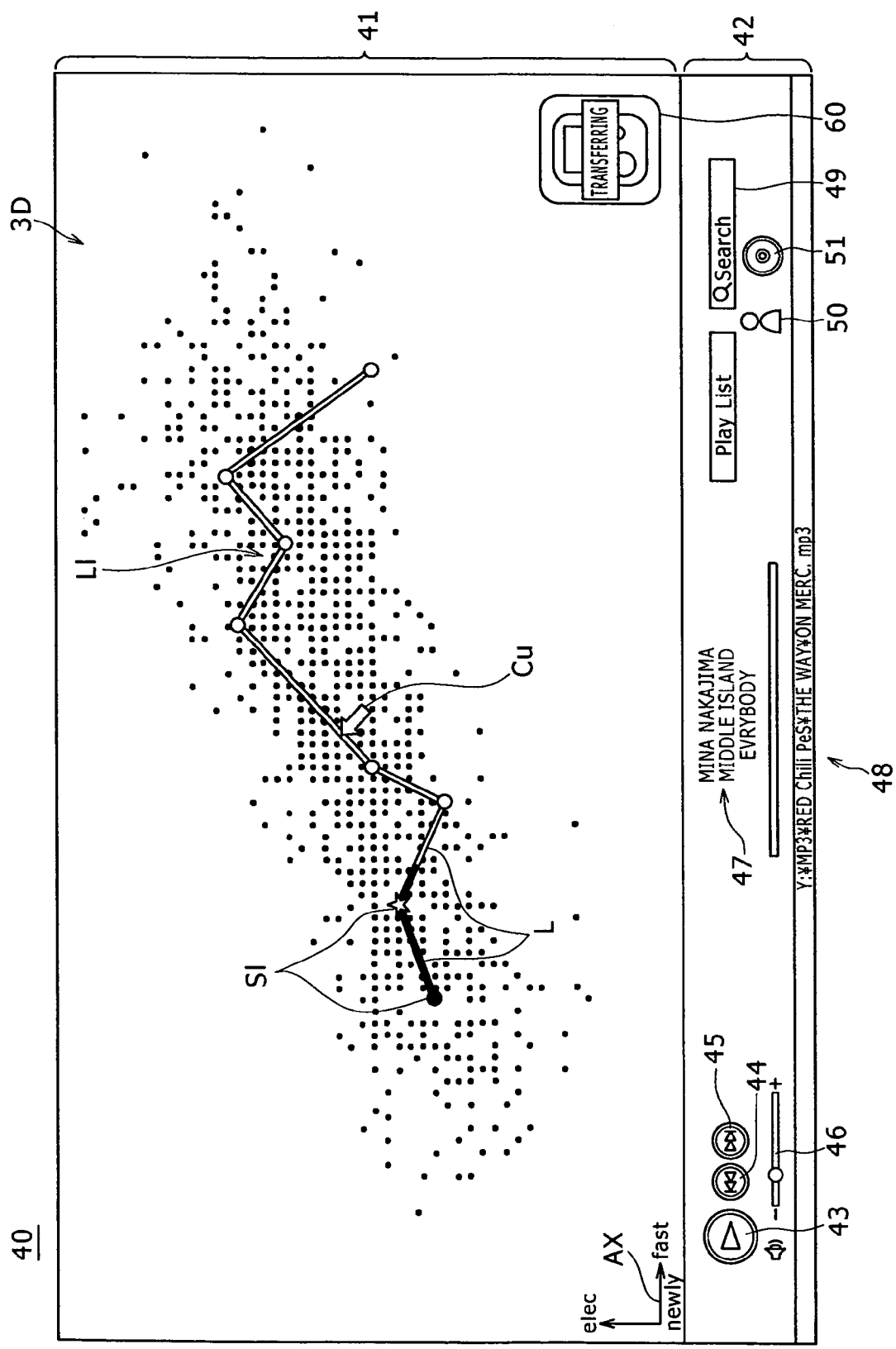
FIG. 18 is an illustration showing structure (10) of the musical piece selection screen.

In addition, after starting the transfer of the playlist PL and the pieces of musical piece data in response to the dropping of the list image LI onto the transfer destination icon 60, the CPU 11 bring the list image LI back to its original display position and displays, on the transfer destination icon 60, characters "TRANSFERRING" indicating that the playlist PL and the pieces of musical piece data are now being transferred as illustrated in FIG. 18.

Moreover, while the playlist PL and the pieces of musical piece data are being transferred, the CPU 11 changes, on the list image LI, the color of the musical piece indication mark SI corresponding to the musical piece data the transfer of which has already been completed (e.g., from white to blue). The CPU 11 changes the shape of the musical piece indication mark SI corresponding to the musical piece data that is currently being transferred (e.g., from the circle to the star shape). Further, the CPU 11 changes the color of the straight lines L that join the musical piece indication marks SI (e.g., from white to blue) continuously from the start point toward the end point of the straight lines L so as to indicate the part of the musical piece data that has already been transferred. In this manner, the CPU 11 enables the user to easily recognize, by viewing the list image LI, a current state of the transfer of the musical piece data.

As described above, the recording and reproducing apparatus 10 according to the second embodiment is configured to transfer, in response to the dragging and dropping of the list image LI onto the transfer destination icon 60, the musical piece data and the playlist PL corresponding to the list image LI to the external device. Thus, it is possible to transfer the playlist PL and the musical piece data to the external device by a simple and intuitive operation.

3. Third Embodiment

Next, a third embodiment of the present invention will be described below. In the third embodiment, the recording and reproducing apparatus 10 has a list acquisition function of acquiring the playlist PL from a server (e.g., the above-described musical piece distribution server) on the network via the network interface 16, in addition to the functions described above with respect to the first embodiment.

3-1. List Acquisition Function

Figure 19:
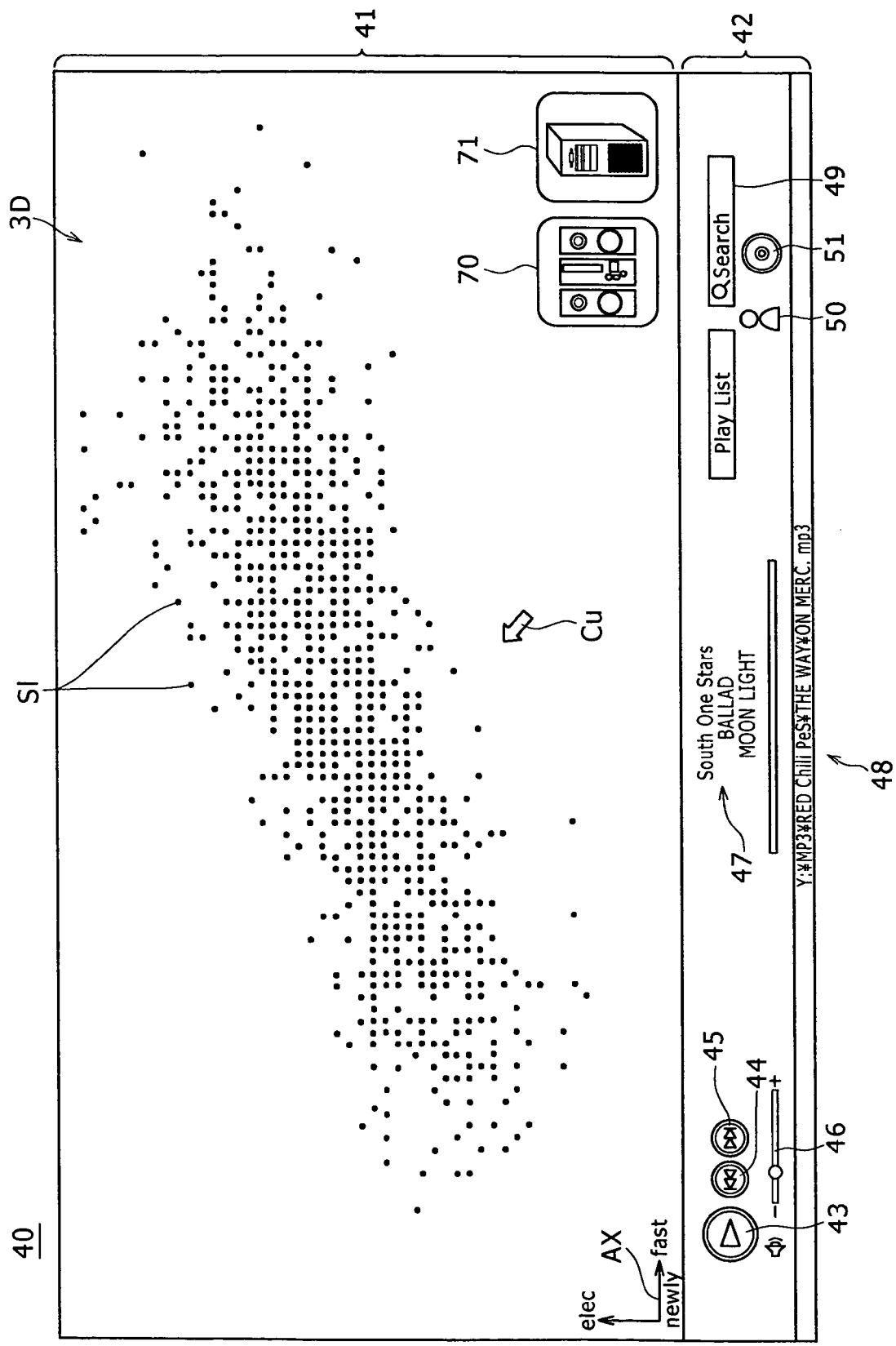
FIG. 19 is an illustration showing structure (11) of the musical piece selection screen.

In practice, as illustrated in the musical piece selection screen 40 of FIG. 19, the CPU 11 of the recording and reproducing apparatus 10 displays a self-representing icon 70 that represents the recording and reproducing apparatus 10 itself within the musical piece selection area 41 in which the three-dimensional image 3D and the axes image AX are displayed. The CPU 11 displays within the musical piece selection area 41, when the server from which the playlist PL is to be acquired has been connected to the recording and reproducing apparatus 10 via the network interface 16, an acquisition source icon 71, which represents the server from which the playlist PL is to be acquired.

Then, if the arrow cursor Cu is moved onto the acquisition source icon 71 by a user operation and the operation key 15 is pressed, for example, the CPU 11 determines that an instruction to acquire the playlist PL from the server represented by the acquisition source icon 71 has been issued and transmits to the server a request signal for requesting acquisition of the playlist PL.

In response to the request signal transmitted from the recording and reproducing apparatus 10, the server transmits to the recording and reproducing apparatus 10 a playlist PLx showing popular musical pieces and a playlist PLy showing musical pieces recommended by an artist, for example. As illustrated in FIGS. 20A and 20B, each of the playlists PLx and PLy transmitted from the server includes a title as well as the musical piece identifiers SS composed of ID numbers unique to respective musical pieces and the first, second, and third impression item values SP, EL, and NE (i.e., the three-dimensional coordinates) of each of the musical pieces identified by the musical piece identifiers SS. In addition, the playlist PLy showing the musical pieces recommended by the artist also includes a position at which an image of a face of the artist is stored (i.e., an address from which the image is to be downloaded).

Upon receipt of the playlists PLx and PLy transmitted from the server, as illustrated in FIG. 21, the CPU 11 selects the musical piece indication marks SI that are, on the three-dimensional image 3D, at the three-dimensional coordinates defined by the first, second, and third impression item values SP, EL, and NE of each of the musical pieces listed in the playlist PLx. The CPU 11 joins the selected musical piece indication marks SI by line segments in the order as indicated by the playlist PLx, thereby displaying a list image LIx. In addition, the CPU 11 displays a balloon image BIx that points to the list image LIx and has shown therein the title of the playlist PLx, "Five Most Popular Musical Pieces".

Similarly, the CPU 11 selects the musical piece indication marks SI that are, on the three-dimensional image 3D, at the three-dimensional coordinates defined by the first, second, and third impression item values SP, EL, and NE of each of the musical pieces listed in the playlist PLy. The CPU 11 joins the selected musical piece indication marks SI by line segments in the order as indicated by the playlist PLy, thereby displaying a list image LIy. In addition, the CPU 11 displays a balloon image BIy that points to the list image LIy and has shown therein the title of the playlist PLy, "Mina Nakajima's Recommendations", and the image of the face of the artist, the storage position of the image being described in the playlist PLy.

Any of the musical piece indication marks SI whose three-dimensional coordinates are each defined by a separate set of the first, second, and third impression item values SP, EL, and NE described in the playlist PLx or PLy may not be contained in the three-dimensional image 3D, i.e., in the case where any of the pieces of musical piece data described in the playlist PLx or PLy is not stored in the recording and reproducing apparatus 10. In that case, the CPU 11 additionally displays that missing musical piece indication mark SI in the three-dimensional image 3D and selects the added musical piece indication mark SI.

As described above, the recording and reproducing apparatus 10 according to the third embodiment does not display the playlists PLx and PLy acquired from the server in the form of character information but displays them in the form of the list images LIx and LIy on the three-dimensional image 3D. Therefore, it is possible to enable the user to easily visually recognize, by viewing the three-dimensional image 3D, what impressions the musical pieces listed in the playlists PLx and PLy acquired from the server give and in what order the musical pieces are reproduced.

Further, if, after the list images LIx and LIy are displayed in the above-described manner, the list image LIx, for example, is dragged onto the self-representing icon 70 and dropped thereon as illustrated in FIG. 22, the CPU 11 of the recording and reproducing apparatus 10 determines that an instruction to acquire from the server the pieces of musical piece data corresponding to the musical piece indication marks SI contained in the list image LIx (i.e., the pieces of musical piece data indicated in the playlist PLx) has been issued. The CPU 11 transmits to the server a request signal for requesting the acquisition of the pieces of musical piece data indicated in the playlist PLx, thereby starting the acquisition of the pieces of musical piece data indicated in the playlist PLx. Note that, in this case, the CPU 11 acquires from the server only a piece of musical piece data that is not stored in the recording and reproducing apparatus 10 among the pieces of musical piece data indicated in the playlist PLx.

Figure 23:
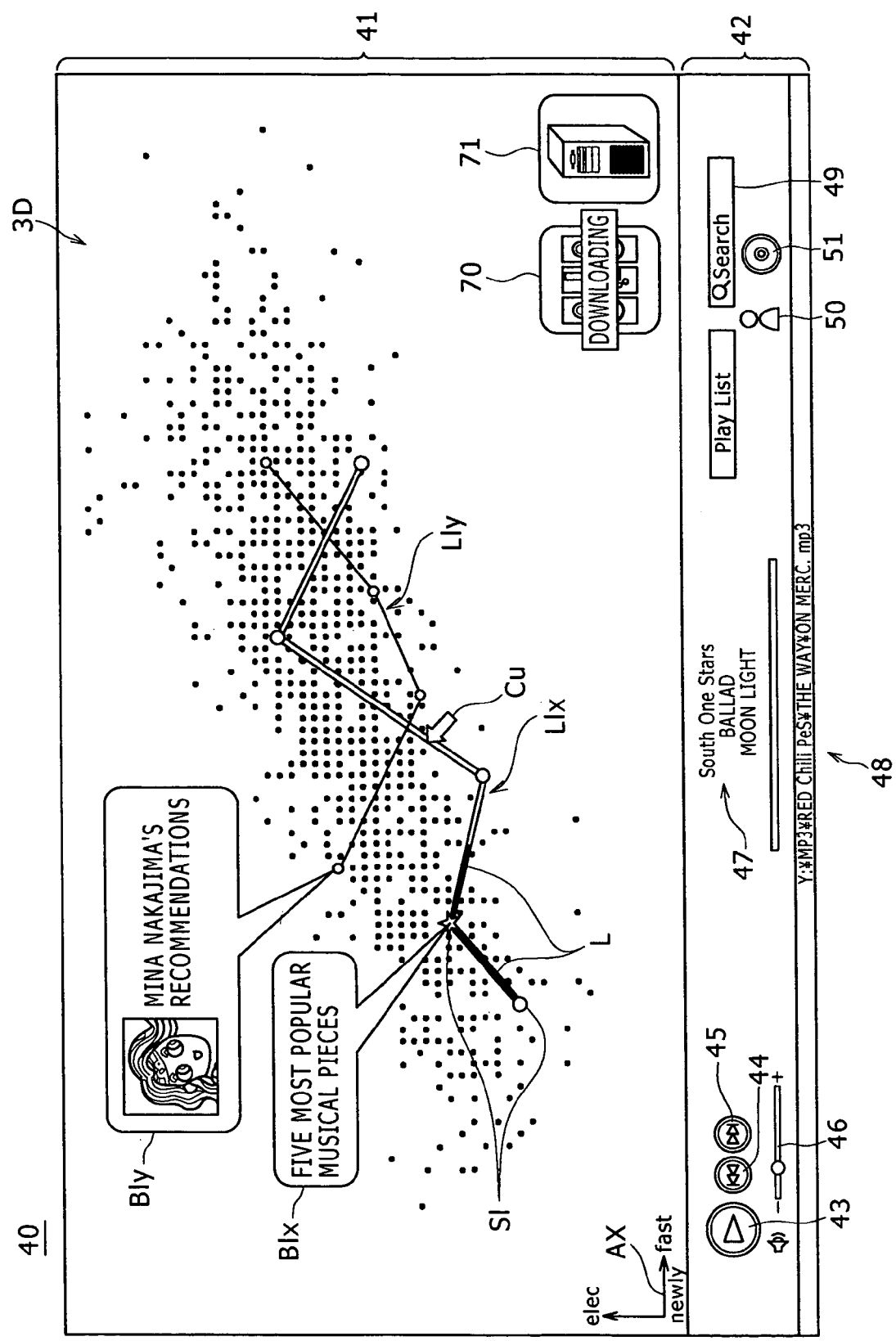
FIG. 23 is an illustration showing structure (14) of the musical piece selection screen.

After starting the acquisition of the piece(s) of musical piece data indicated in the playlist PLx in response to the dragging and dropping of the list image LIx onto the self-representing icon 70 in the above-described manner, the CPU 11 brings the list image LIx back to its original display position and displays on the self-representing icon 70 characters "DOWNLOADING" indicating that any musical piece data is now being acquired as illustrated in FIG. 23.

Further, at the time of acquiring the musical piece data, the CPU 11 changes, on the list image LIx, the color of the musical piece indication mark SI corresponding to the musical piece data whose acquisition has already been completed (e.g., from white to yellow) and also changes the shape of the musical piece indication mark SI corresponding to the musical piece data that is currently being acquired (e.g., from the circle to the star shape). Still further, the CPU 11 changes the color of the straight lines L that join the musical piece indication marks SI (e.g., from white to yellow) continuously from the start point toward the end point of the straight lines L so as to indicate the part of the musical piece data that has already been acquired.

In this manner, the CPU 11 enables the user to easily recognize, by viewing the list image LIx, a current state of the acquisition of the musical piece data.

As described above, the recording and reproducing apparatus 10 according to the third embodiment is configured, in response to the dragging and dropping of the list image LIx onto the self-representing icon 70, to acquire from the server the piece(s) of musical piece data indicated in the playlist PLx corresponding to the list image LIx. Thus, it is possible to acquire from the server the musical piece data by a simple and intuitive operation.

4. Fourth Embodiment

Next, a fourth embodiment of the present invention will be described below. In the fourth embodiment, the recording and reproducing apparatus 10 has, in addition to the functions described above with respect to the first embodiment, a "similar-impression musical piece data reproduction function". The term "similar-impression musical piece data reproduction function" as used herein refers to a function performed when reproducing a piece of piece data randomly designated from among a musical piece data corresponding to a selected musical piece indication mark SI and one or more pieces of musical piece data whose impressions are similar to that of the musical piece data corresponding to the selected musical piece indication mark SI instead of simply reproducing the musical piece data corresponding to the selected musical piece indication mark SI.

4-1. Similar-Impression Musical Piece Data Reproduction Function

Figure 24:
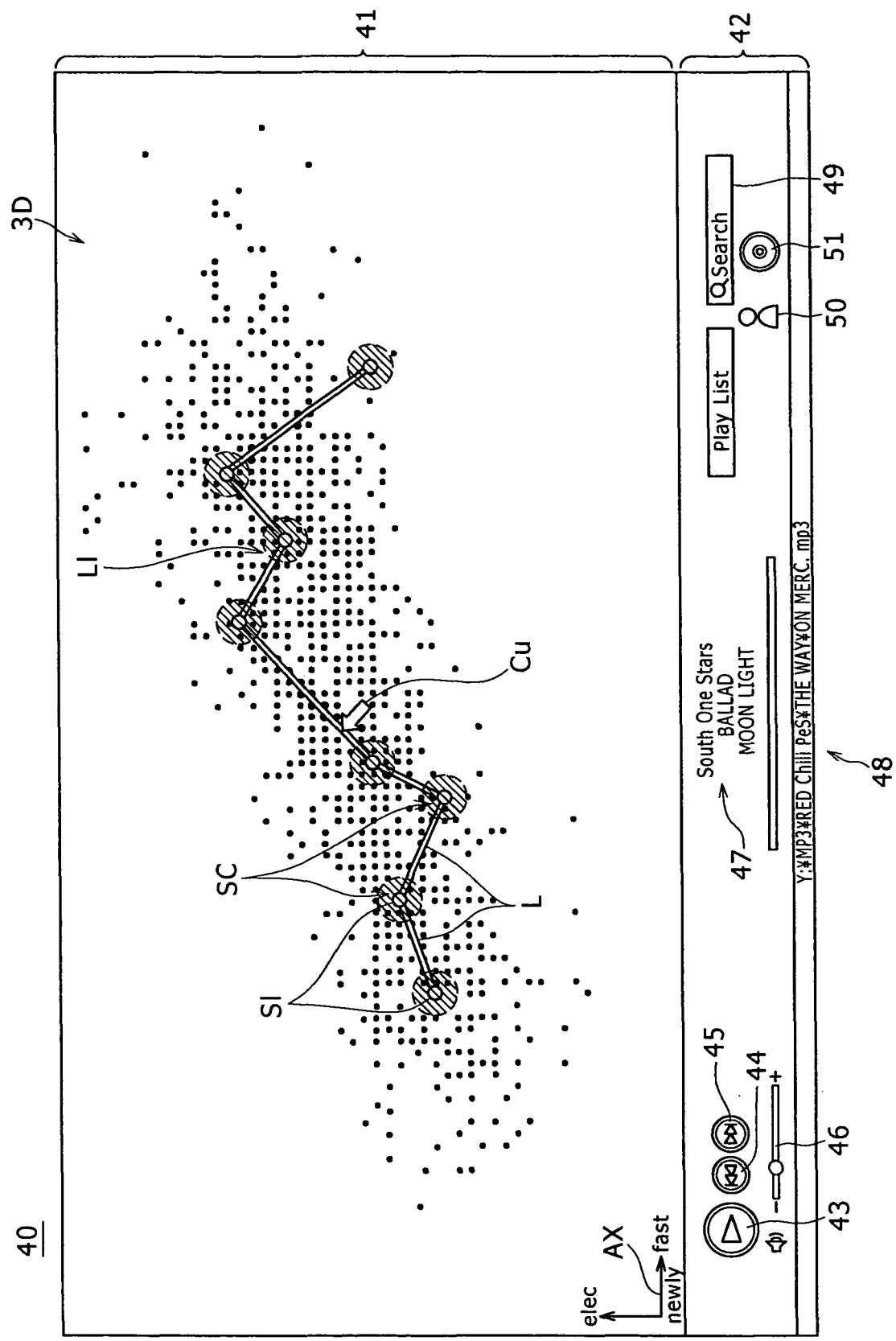
FIG. 24 is an illustration showing structure (15) of the musical piece selection screen.

In practice, when at least two musical piece indication marks are selected from the plurality of musical piece indication marks SI arranged in the three-dimensional image 3D in accordance with a user operation, the CPU 11 of the recording and reproducing apparatus 10 generates the playlist PL containing the plurality of pieces of musical piece data corresponding to the selected musical piece indication marks SI arranged in ascending order of the first impression item value SP. In addition, as illustrated in FIG. 24, the CPU 11 also displays a list image LI containing white straight lines L that join the selected plurality of musical piece indication marks SI in ascending order (i.e., in the order indicated by the playlist PL) of the x-coordinate (i.e., the first impression item value SP), and semitransparent spheres SC each with a predetermined radius and centered on a separate one of the selected musical piece indication marks SI.

Because the musical piece indication marks SI are placed closer to one another in the three-dimensional image 3D as the similarity in impression of the corresponding musical pieces increases, each of the spheres SC indicates a range that contains a musical piece indication mark(s) SI and corresponding musical piece(s) which gives an impression similar to that of the musical piece corresponding to the musical piece indication mark SI placed at the center of the sphere SC. Accordingly, the CPU 11 recognizes the musical piece(s) corresponding to the musical piece indication mark(s) SI within each sphere SC as a musical piece(s) that gives an impression similar to that of the musical piece corresponding to the musical piece indication mark SI placed at the center of the sphere SC.

Then, if the Play button 43 is activated when the above-described list image LI is being displayed, the CPU 11, in response thereto, reads a piece of musical piece data randomly designated from among the musical piece data corresponding to the musical piece indication mark SI having the smallest x-coordinate of all of the selected musical piece indication marks SI (i.e., the musical piece data listed at the top of the playlist PL) and one or more pieces of musical piece data that have been recognized as giving an impression similar to that musical piece data. Then, the CPU 11 starts reproducing the read musical piece data. After the reproduction of this musical piece data is completed, the CPU 11 subsequently reads a piece of musical piece data randomly designated from among the musical piece data corresponding to the musical piece indication mark SI having the second smallest x-coordinate of all of the selected musical piece indication marks SI (i.e., the musical piece data listed second from the top of the playlist PL) and one or more pieces of musical piece data that have been recognized as giving an impression similar to that musical piece data. Then, the CPU 11 starts reproducing the read musical piece data. Thereafter, the CPU 11 performs similar processes with respect to the remaining selected musical piece indication marks SI in ascending order of the x-coordinate (i.e., in the order indicated by the playlist PL).

As described above, instead of simply reproducing the musical piece data corresponding to each of the selected musical piece indication marks SI, the recording and reproducing apparatus 10 according to the fourth embodiment reproduces a piece of musical piece data randomly designated from among the musical piece data corresponding to the selected musical piece indication mark SI and one or more pieces of musical piece data that give an impression similar to that musical piece data. Therefore, it is possible to allow the user to listen to a musical piece that gives an impression similar to that of any of the selected musical pieces, not simply allowing the user to listen to only the selected musical pieces.

5. Other Embodiments

In the above-described first embodiment, when a plurality of musical piece indication marks SI are selected, the recording and reproducing apparatus 10 automatically displays the straight lines L that join the selected musical piece indication marks SI in ascending order of the x-coordinate. However, the embodiment of the present invention is not limited to this example. For example, any of the straight lines L that join the selected musical piece indication marks SI may be displayed in accordance with a user operation. Also, the straight lines L may be erasable in accordance with a user operation.

Figure 25:
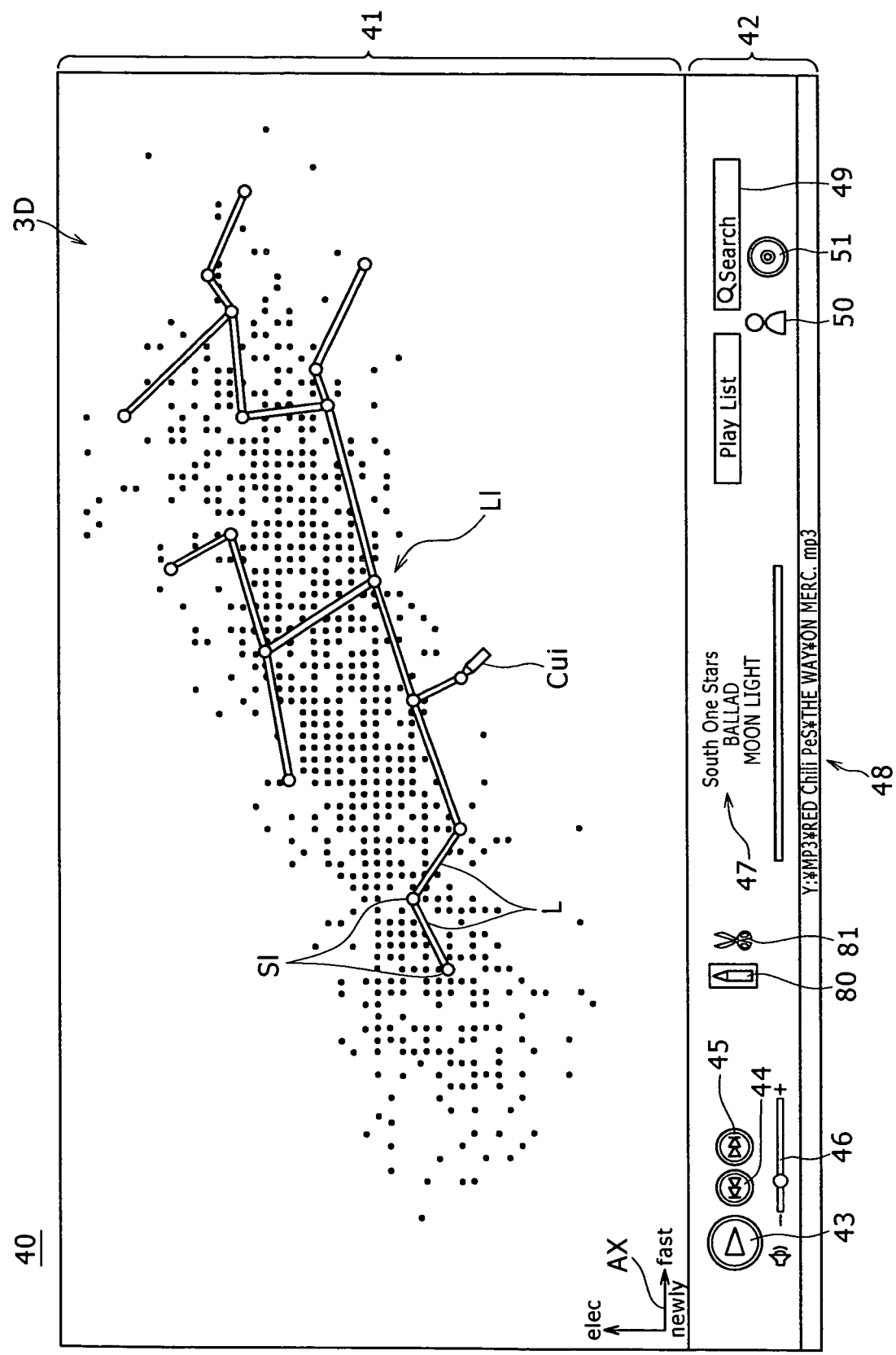
FIG. 25 is an illustration showing structure (16) of the musical piece selection screen.
Figure 26:
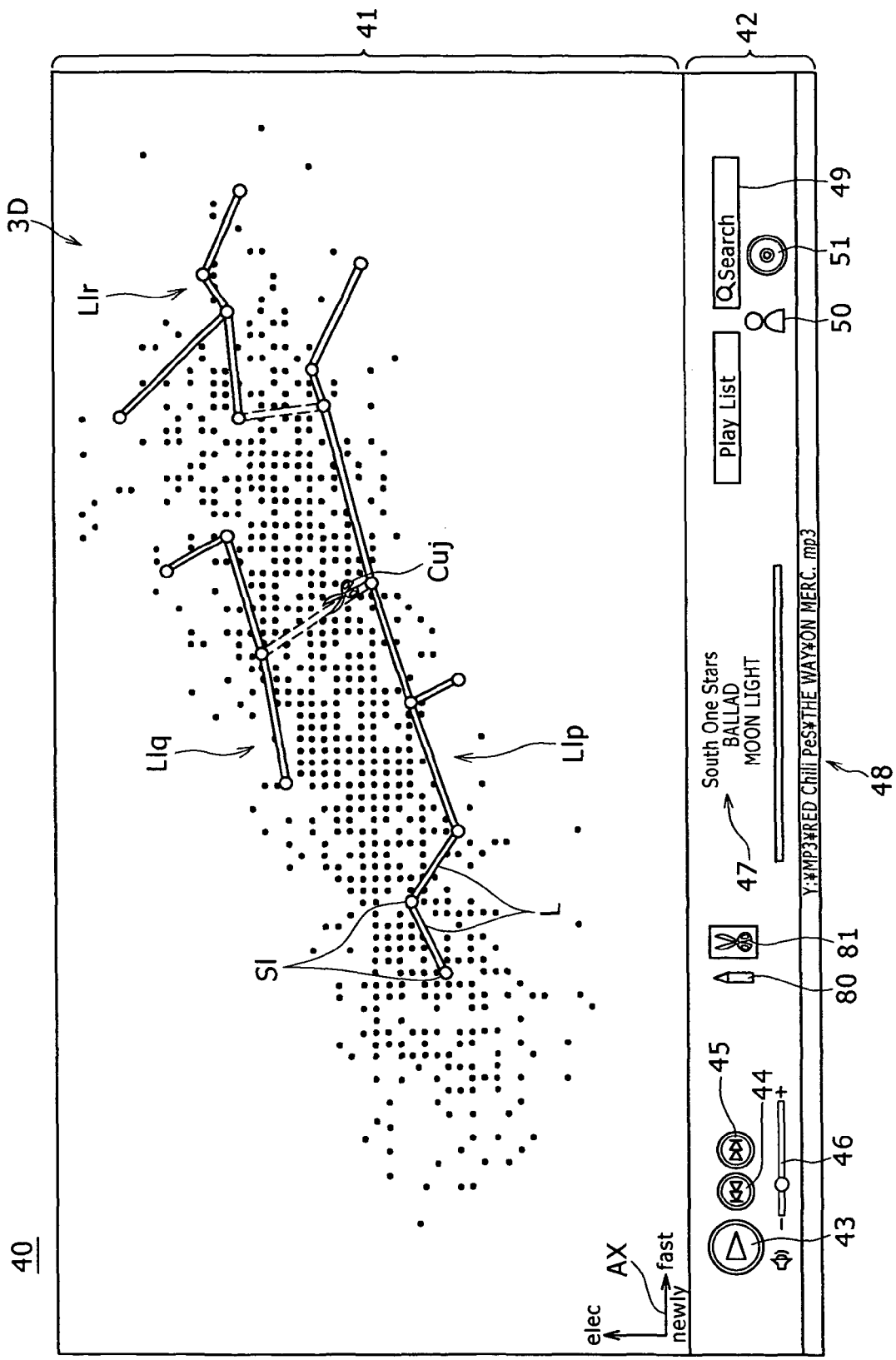
FIG. 26 is an illustration showing structure (17) of the musical piece selection screen.

In this case, as illustrated in FIG. 25, for example, the CPU 11 of the recording and reproducing apparatus 10 displays a musical piece selection screen 40 that includes, within the operation area 42, a line display button 80 for displaying a straight line L and a line eraser button 81 for erasing a straight line L. When the line display button 80 is activated, the CPU 11 replaces the arrow cursor Cu with a pen-shaped cursor Cui that has the shape of a pen. Then, if a musical piece indication mark SI that is to be a start point of a straight line L and a musical piece indication mark SI that is to be an end point of the straight line L are selected successively by the pen-shaped cursor Cui in accordance with a user operation, the CPU 11 displays the straight line L that joins the two selected musical piece indication marks SI together. Meanwhile, if the line eraser button 81 is activated, the CPU 11 replaces the arrow cursor Cu with a scissors-shaped cursor Cuj that has the shape of scissors as illustrated in FIG. 26. Then, if any of the straight lines L displayed is selected by the scissors-shaped cursor Cuj in accordance with a user operation, the CPU 11 erases the selected straight line L.

In addition, each time a straight line L is displayed or erased in the above-described manner, the CPU 11 regenerates the playlist. For example, suppose that a single list image LI containing straight lines L that join a plurality of selected musical piece indication marks SI is currently being displayed within the musical piece selection area 41 (see FIG. 25). In addition, the CPU 11 erases a few of the straight lines L contained in the list image LI in accordance with a user operation, so that the list image LI is divided into three parts, i.e., list images LIp, LIq, and LIr (see FIG. 26). In this case, the CPU 11 accordingly divides the playlist corresponding to the list image LI and newly generates a playlist corresponding to the list image LIp, a playlist corresponding to the list image LIq, and a playlist corresponding to the list image LIr.

Figure 27:
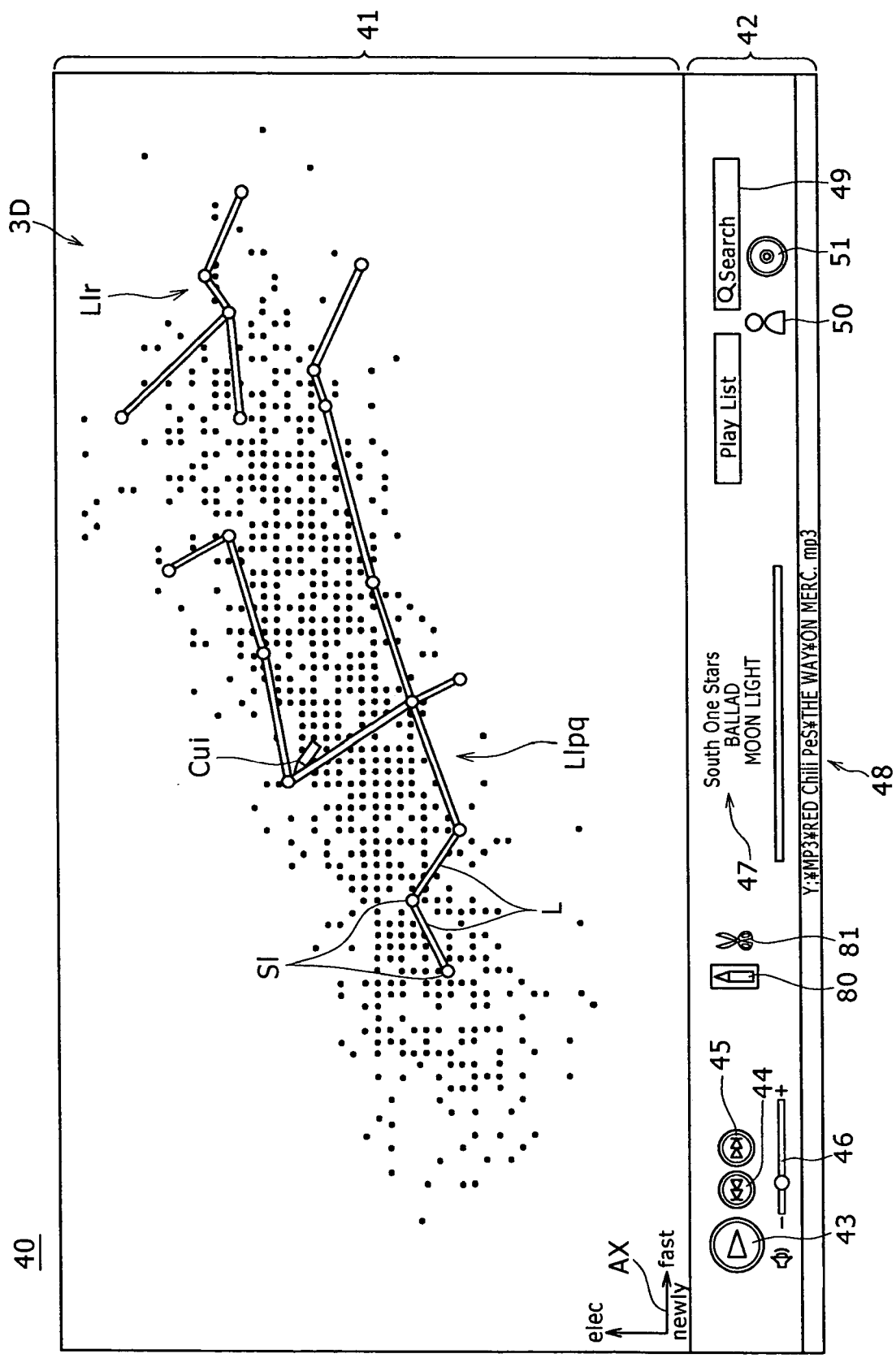
FIG. 27 is an illustration showing structure (18) of the musical piece selection screen.

Further, suppose that, as illustrated in FIG. 27, the CPU 11 has displayed a line segment that joins one of the musical piece indication marks SI contained in the list image LIp and one of the musical piece indication marks SI contained in the list image LIq in accordance with a user operation, thereby combining the list image LIp with the list image LIq to make a new list image LIpq, for example. In this case, the CPU 11 combines the playlist corresponding to the list image LIp with the playlist corresponding to the list image LIq, thereby generating a new playlist corresponding to the list image LIpq.

As described above, in the case where the straight line L is displayed or erased in accordance with a user operation, the recording and reproducing apparatus 10 regenerates the playlist on each occasion of the display or erasure of the straight line L. Note that if the erasure of the straight line L results in occurrence of an isolated musical piece indication mark SI that is not joined with any other musical piece indication mark SI, a playlist including only a single piece of musical piece data corresponding to the isolated musical piece indication mark SI may not be generated.

In the above-described first embodiment, if the Play button 43 is activated when the list image LI is being displayed, the pieces of musical piece data are reproduced in the order as indicated by the list image LI (i.e., in the order indicated by the playlist). However, the embodiment of the present invention is not limited to this example. For example, regardless of the order indicated by the list image LI, the pieces of musical piece data may be reproduced in an arbitrary order in accordance with a user operation.

Figure 28:
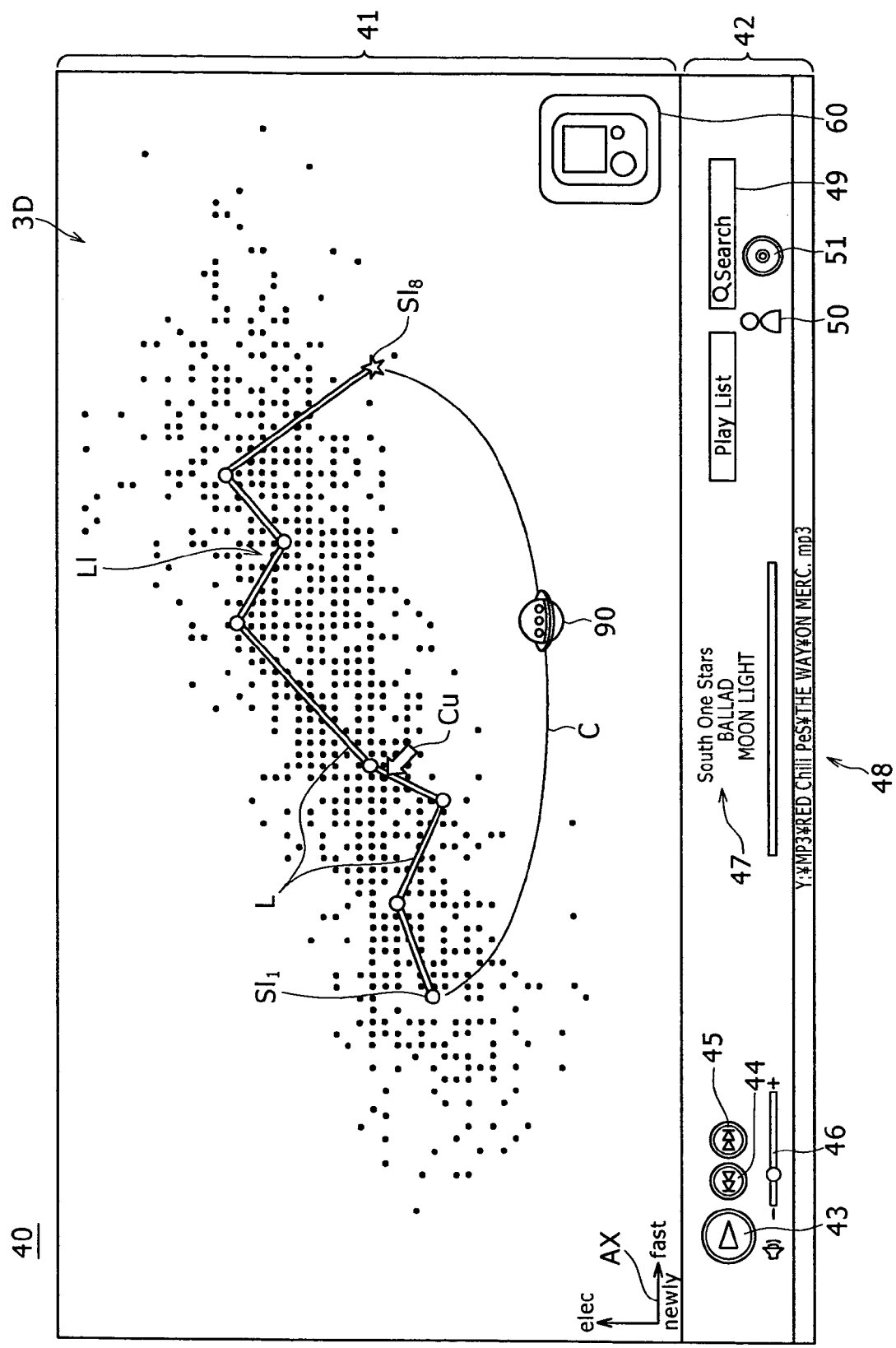
FIG. 28 is an illustration showing structure (19) of the musical piece selection screen.

For example, suppose that when the list image LI as illustrated in FIG. 10 is being displayed, an instruction to reproduce, next to the musical piece data corresponding to the musical piece indication mark $SI_8$, the musical piece data corresponding to the musical piece indication mark $SI_1$ is issued by a user operation. The mark $SI_1$ is not joined with the musical piece indication mark $SI_8$ by any straight line L. In this case, as illustrated in FIG. 28, the CPU 11 joins the musical piece indication mark $SI_8$ with the musical piece indication mark $SI_1$ by a curve C, which is distinct from the straight line L.

Then, when the reproduction of the musical piece data corresponding to the musical piece indication mark $SI_8$ is started, the CPU 11 changes the shape of the musical piece indication mark $SI_8$ (e.g., from the circle to the star shape) and also displays a reproduction position icon 90 that moves on the curve C from the musical piece indication mark $SI_8$ toward the musical piece indication mark $SI_1$ in accordance with a current reproduction position of the musical piece data corresponding to the musical piece indication mark $SI_8$.

Accordingly, even when the plurality of pieces of musical piece data corresponding to the selected musical piece indication marks SI are reproduced in an order different from that indicated by the list image LI, the recording and reproducing apparatus 10 is able to enable the user to easily recognize the order in which they are reproduced and the current reproduction position of the musical piece data that is currently being reproduced.

In the above-described first embodiment, the selected plurality of musical piece indication marks SI are joined by the straight lines L in ascending order of the first impression item value SP. However, the embodiment of the present invention is not limited to this example. For example, the selected plurality of musical piece indication marks SI may be joined by the straight lines L in various other orders based on the musical piece analysis information 30 and/or the musical piece-related information, e.g., an order based on the second impression item value EL, an order based on the third impression item value NE, an order based on track numbers, etc. Further, the order in which they are joined may be specified by the user.

In the above-described first embodiment, when the plurality of musical piece indication marks SI are selected, the list image LI is displayed on the three-dimensional image 3D. However, the embodiment of the present invention is not limited to this example. For example, the musical piece-related information (e.g., the titles of the musical pieces, the album title, the artist name, the image of the album jacket, etc.) of the pieces of musical piece data corresponding to the musical piece indication marks SI contained in the list image LI may be displayed close to the list image LI.

Figure 29:
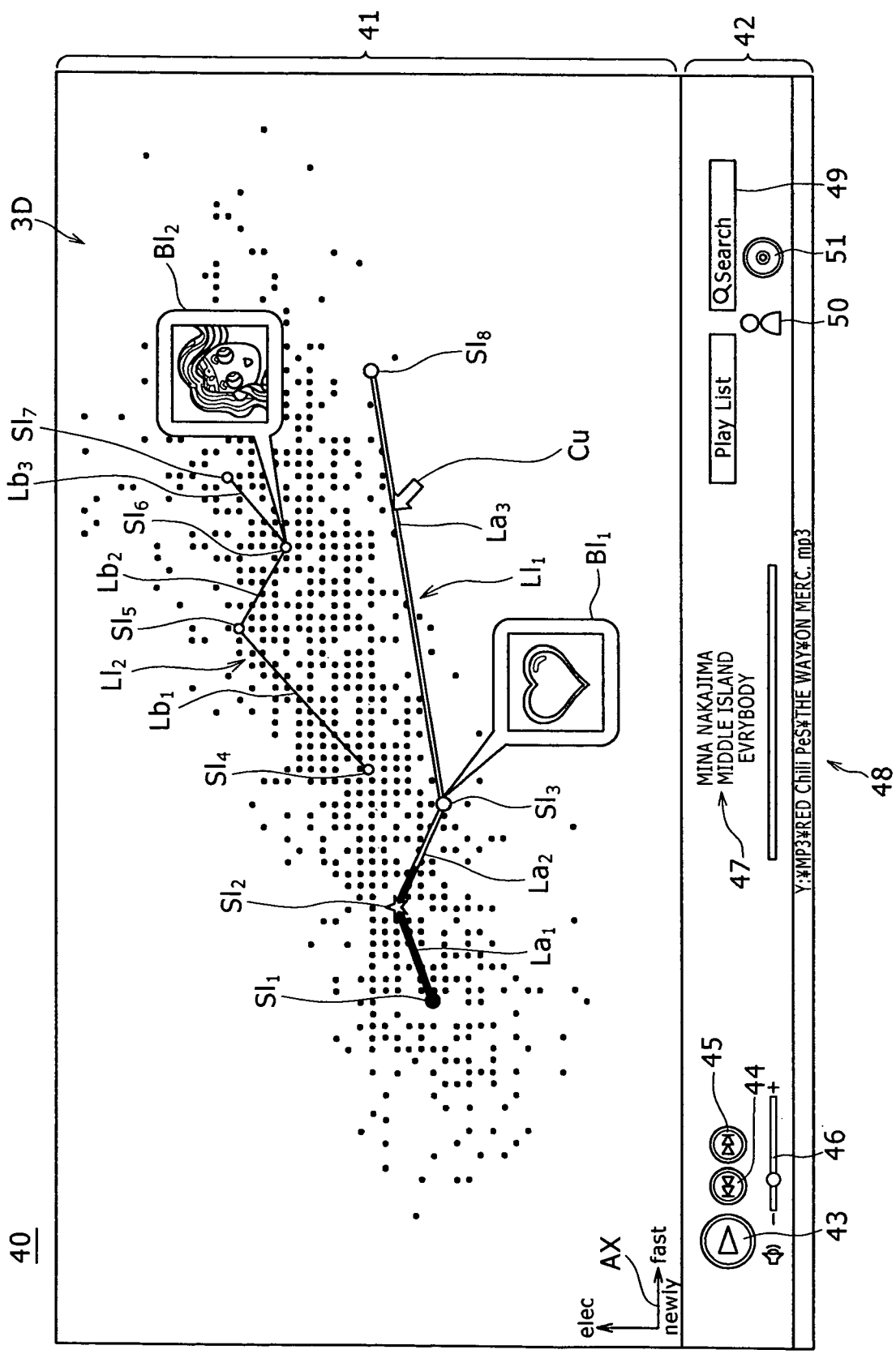
FIG. 29 is an illustration showing structure (20) of the musical piece selection screen.

For example, suppose that, as in the above-described first embodiment, the plurality of pieces of musical piece data found as a result of searching for musical piece data whose artist name is "Mina Nakajima" are classified by album title. As a result, the list image $LI_1$ representing the playlist containing the pieces of musical piece data whose artist name is "Mina Nakajima" and whose album title is "MIDDLE ISLAND" and the list image $LI_2$ representing the playlist containing the pieces of musical piece data whose artist name is "Mina Nakajima" and whose album title is "HALLO" are displayed. In this case, as illustrated in FIG. 29, the recording and reproducing apparatus 10 displays, in addition to the list images $LI_1$ and $LI_2$, balloon images $BI_1$ and $BI_2$. The balloon image $BI_1$ points to the list image $LI_1$ and has shown therein the image of the album jacket corresponding to the pieces of musical piece data whose artist name is "Mina Nakajima" and whose album title is "MIDDLE ISLAND." The balloon image $BI_2$ points to the list image $LI_2$ and has shown therein the image of the album jacket corresponding to the pieces of musical piece data whose artist name is "Mina Nakajima" and whose album title is "HALLO."

Accordingly, the recording and reproducing apparatus 10 is able to allow the user to recognize, more accurately, what musical piece-related information the pieces of musical piece data corresponding to the musical piece indication marks SI contained in the list image LI have.

In the above-described first embodiment, the plurality of pieces of musical piece data found as a result of searching for musical piece data whose artist name is "Mina Nakajima" (first attribute information) are classified by album title (second attribute information). However, the embodiment of the present invention is not limited to this example. The search and classification may be performed based on various other types of attribute information included in the musical piece-related information or the musical piece analysis information 30.

In the above-described first embodiment, the dot-like musical piece indication marks SI are displayed, the musical piece indication marks SI are changed in color and magnified when selected, and the musical piece indication mark SI corresponding to the musical piece data that is currently being reproduced is changed in shape. However, the embodiment of the present invention is not limited to this example. For example, the color or shape of the musical piece indication mark SI may be changed in accordance with the reproduction frequency of the corresponding musical piece data, the genre of the corresponding musical piece data, or the like.

In the above-described first embodiment, the selected plurality of musical piece indication marks SI are joined by the straight lines L. However, the embodiment of the present invention is not limited to this example. For example, an arrow pointing from the musical piece indication mark SI that is the start point of the straight line L toward the musical piece indication mark SI that is the end point of the straight line L may be added to the straight line L. This enables the user to recognize, more accurately, the order in which the musical piece indication marks SI are joined (i.e., the order in which the corresponding pieces of musical piece data are reproduced).

Figure 30:
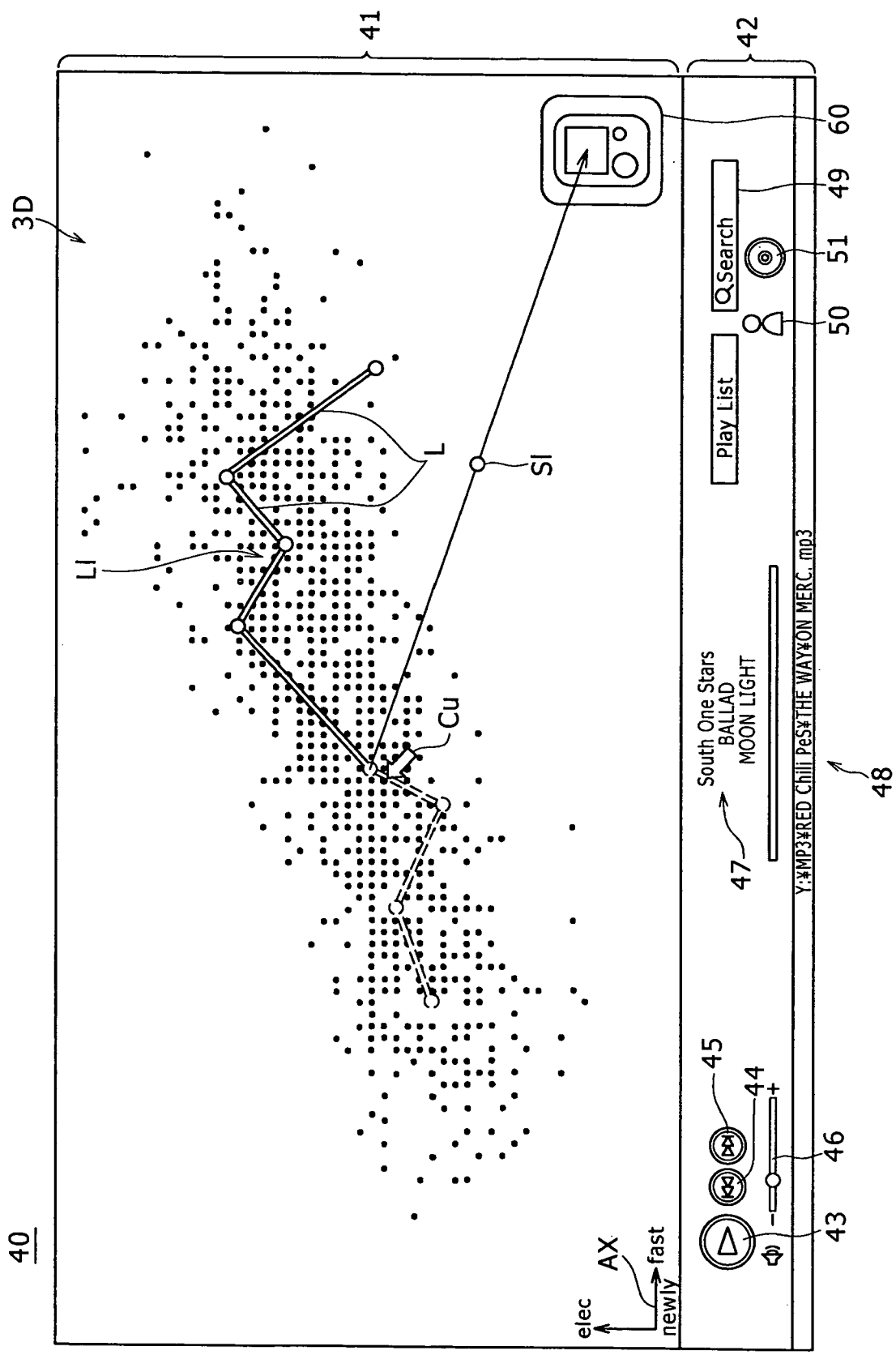
FIG. 30 is an illustration showing structure (21) of the musical piece selection screen.

In the above-described second embodiment, at the time of the transfer of the playlist PL and the musical piece data, the musical piece indication mark(s) SI on the list image LI is caused to change in color (e.g., from white to blue) and shape. The color of the straight lines L is caused to change continuously from the start point toward the end point of the straight lines L so that the user is able to visually recognize the current state of the transfer. However, the embodiment of the present invention is not limited to this example. For example, as illustrated in FIG. 30, animation of moving the musical piece indication mark SI corresponding to the currently transferred musical piece data from its original position toward the transfer destination icon 60 as a shooting star may be presented to allow the user to visually recognize the current state of the transfer. In this case the straight line(s) L that is connected to and precedes the musical piece indication mark SI that is caused to move toward the transfer destination icon 60 may be erased.

In the above-described third embodiment, when the list image LI displayed based on the playlist PL acquired from the server is dragged and dropped onto the self-representing icon 70 in accordance with the user operation, the musical piece data indicated in the playlist PL is acquired from the server. However, the embodiment of the present invention is not limited to this example. For example, in the case where any musical piece data indicated in the playlist PL is available on a chargeable basis, the server may automatically perform an accounting process with respect to the musical piece data at the time of the acquisition of the musical piece data.

The above-described third embodiment has been described with reference to an exemplary case where the playlist PL transmitted from the server contains at least the title thereof, the musical piece identifiers SS constituted by the ID numbers unique to the musical pieces, and the first, second, and third impression item values SP, EL, and NE of each of the musical pieces identified by the musical piece identifiers SS. However, the embodiment of the present invention is not limited to this example. For example, a storage position (i.e., a download address) of data of the most impressive portion of each musical piece may be added to the playlist PL transmitted from the server. In this case, when the list image LI is displayed based on the playlist PL acquired from the server and thereafter one of the musical piece indication marks SI contained in the list image LI is specified using the arrow cursor Cu, for example, the recording and reproducing apparatus 10 acquires the data of the most impressive portion of the musical piece corresponding to the specified musical piece indication mark SI from the storage position thereof as indicated in the playlist PL and reproduces the acquired data. Thus, the recording and reproducing apparatus 10 is able to allow the user to check the musical piece before acquiring from the server the musical piece data indicated in the playlist PL.

The above-described third embodiment has been described with reference to an exemplary case where the playlist PL is acquired from the server. However, the embodiment of the present invention is not limited to this example. For example, a playlist PL generated by the recording and reproducing apparatus 10 may be transferred to the server. In this case, when a list image LI displayed as a result of selecting a plurality of musical piece indication marks SI is dragged and dropped onto the acquisition source icon 71 representing the server in accordance with a user operation, for example, the recording and reproducing apparatus 10 starts transferring to the server the playlist PL generated so as to correspond to the list image LI.

The above-described third embodiment has been described with reference to an exemplary case where the playlists PLx and PLy designated by the server are acquired by the recording and reproducing apparatus 10. However, the embodiment of the present invention is not limited to this example. For example, the recording and reproducing apparatus 10 may have preference information, such as a favorite artist, a favorite impression, a favorite genre, etc., specified by the user registered therein beforehand, and, when attempting to acquire a playlist PL from the server, transfer the preference information to the server so that a playlist PL that accords with the preference information is acquired from the server.

The above-described third embodiment has been described with reference to an exemplary case where, out of the corresponding to the musical piece indication marks SI contained in the list image LIx (i.e., the data listed in the playlist PLx acquired from the server), the piece(s) of musical piece data that is/are not stored in the recording and reproducing apparatus 10 is/are acquired from the server in response to the drag and drop operations for the list image LIx. However, the embodiment of the present invention is not limited to this example. For example, the recording and reproducing apparatus 10 may acquire from the server, out of the pieces of musical piece data corresponding to the musical piece indication marks SI contained in the list image LIx, the piece(s) of musical piece data that is/are not stored in the recording and reproducing apparatus 10 in response to the activation of the Play button 43 when the list image LIx is being selected.

In other words, the recording and reproducing apparatus 10 may acquire from the server, out of the pieces of musical piece data corresponding to the musical piece indication marks SI contained in the list image LIx, the piece(s) of musical piece data that is/are not stored in the recording and reproducing apparatus 10 in response to issuance of a play command for the list image LIx. This eliminates a need for the user to perform an operation, such as the drag and drop operations, to issue the instruction to acquire the musical piece data. That is, the reproduction of the pieces of musical piece data corresponding to the musical piece indication marks SI contained in the list image LIx can be performed without the need for the user to be conscious of the acquisition of the musical piece data.

In practice, when the pieces of musical piece data corresponding to the musical piece indication marks SI contained in the list image LIx are reproduced, the piece(s) of musical piece data that is/are not stored in the recording and reproducing apparatus 10 may be reproduced either after the acquisition thereof from the server is completed or in course of the acquisition thereof from the server (i.e., so-called streaming reproduction). In this case, the musical piece data corresponding to the whole of the musical piece may be acquired for reproduction, or alternatively the musical piece data corresponding to only the most impressive portion of the musical piece may be acquired for reproduction. In other words, regarding the piece(s) of musical piece data that is/are not stored in the recording and reproducing apparatus 10, among the pieces of musical piece data corresponding to the musical piece indication marks SI contained in the list image LIx, it may be so arranged that only the most impressive portion of the corresponding musical piece is reproduced for the user to check the musical piece.

The above-described embodiments have been described with reference to an exemplary case that is applied to the recording a reproducing apparatus 10 that deals with the musical piece data as contents. However, the embodiment of the present invention is not limited to this example. The embodiment of the present invention is also applicable to apparatuses that deal with various other types of contents. For example, the embodiment of the present invention is applicable to a recording and reproducing apparatus that deals with video data, a recording and reproducing apparatus that deals with still image data, and so on.

Further, the above-described embodiments have been described with reference to an exemplary case where the CPU 11 of the recording and reproducing apparatus 10 performs the above-described processes, such as the list image display process, in accordance with the program installed on the hard disk drive 12 or the ROM 13. However, the embodiment of the present invention is not limited to this example. For example, the program for performing the processes such as the list image display process may be stored in a storage medium such as a CD.

Further, the above-described embodiments have been described with reference to an exemplary case where the recording and reproducing apparatus 10 is primarily composed of: the CPU 11 that serves as the display control section, the selection section, and a list generation section; the operation key 15 that serves as a line editing section and a line segment manipulation section; the network interface 16 that serves as an acquisition section; the audio processing section 18 and the loudspeaker 23 that serve as a reproduction section; the display controller 19 that serves as the display control section; the external device interface 20 that serves as a transfer section; and the display 22 that serves as the display section. However, the embodiment of the present invention is not limited to this example. The recording and reproducing apparatus 10 may have any structure as long as it is capable of performing the above-described functions.

Note that the display section 2 connected to the display apparatus 1 as illustrated in FIG. 1 corresponds to the display 22 of the recording and reproducing apparatus 10 as illustrated in FIG. 2. The display control section 3 of the display apparatus 1 (FIG. 1) corresponds to the CPU 11 and the display controller 19 of the recording and reproducing apparatus 10 (FIG. 2). The selection section 4 of the display apparatus 1 (FIG. 1) corresponds to the CPU 11 of the recording and reproducing apparatus 10 (FIG. 2).

The present invention can be widely used in various devices, such as a personal computer, an audio device, and the like, that have a display section and deal with a plurality of pieces of content data.

It should be understood by those skilled in the art that various modifications, combinations, sub-combinations and alterations may occur depending on design requirements and other factors insofar as they are within the scope of the appended claims or the equivalents thereof.

What is claimed is:

1. A display apparatus, comprising:
at least one processor adapted to:
cause a display to display an image that contains a plurality of content indication marks each associated with a separate content of a plurality of contents, each of the plurality of content indication marks being arranged at a position corresponding to an impression of the content associated;
select two or more content indication marks from the plurality of content indication marks arranged in the image;
when the two or more content indication marks are selected display, on the image, a line segment that joins the selected two or more content indication marks so as to indicate an order in which the contents corresponding to the selected two or more content indication marks are arranged; and
when the contents are reproduced in the order indicated by the line segment, change a mode of display of the line segment in accordance with a current reproduction position of the contents.

2. The display apparatus according to claim 1, wherein said at least one processor is adapted to select the two or more content indication marks from the plurality of content indication marks arranged in the image based on at least one piece of attribute information each indicating an attribute of a separate content of the plurality of contents.

3. The display apparatus according to claim 2, wherein,
each piece of attribute information includes first attribute information and second attribute information,
wherein said at least one processor is further adapted to:
select the two or more content indication marks from the plurality of content indication marks arranged in the image based on the first attribute information, and
join the two or more content indication marks by the line segment such that the selected two or more content indication marks as joined by the line segment are divided into separate groups based on the second attribute information, the separate contents associated with to the content indication marks in a separate group having the same second attribute information.

4. The display apparatus according to claim 1, wherein the at least one processor is further adapted to:
generate a list that indicates an order in which the contents are arranged, the order being indicated by the line segment.

5. The display apparatus according to claim 4, wherein the at least one processor is further adapted to:
erase an arbitrary line segment that joins the selected two or more content indication marks or display a new line segment;
if the arbitrary line segment is erased, generate a list that contains the content associated with one of the two content indication marks that were joined by the arbitrary line segment, and also generate a list that contains the content associated with the other of the two content indication marks that were joined by the arbitrary line segment, and
if the new line segment is displayed, generate a list composed of a combination of a list that contains the content associated with one of the two content indication marks joined by the new line segment and a list that contains the content associated with the other of the two content indication marks joined by the new line segment.

6. The display apparatus according to claim 4, wherein the at least one processor is further adapted to:

display, on the image, a transfer destination icon that represents the external transfer destination;
move, on the image, the line segment displayed on the image; and
when the line segment is moved onto the transfer destination mark, transfer, to an external transfer destination, the list and, as necessary, one or more of the contents indicated in the list.

7. The display apparatus according to claim 6, wherein the at least one processor is further adapted to:
when the one or more of the contents are transferred, change a mode of display of the content indication marks corresponding to the one or more of the contents that are transferred in accordance with a current state of the transfer of the one or more of the contents.

8. The display apparatus according to claim 1, wherein the at least one processor is further adapted to:
display, on the image, an acquisition source mark that represents the external acquisition source;
move, on the image, the line segment displayed on the image; and
when the line segment is moved onto the acquisition source mark, acquire, from an external acquisition source, one or more of the contents corresponding to the selected two or more content indication marks joined by the line segment.

9. The display apparatus according to claim 8, wherein the at least one processor is further adapted to:
when the one or more of the contents are acquired, change a mode of display of the content indication mark or marks associated with the one or more of the contents that are acquired so as to indicate a current state of the acquisition of the one or more of the contents.

10. The display apparatus according to claim 1, wherein the at least one processor is further adapted to:
to reproduce the contents associated with the selected two or more content indication marks in the order indicated by the displayed line segment.

11. The display apparatus according to claim 10, wherein the at least one processor is further adapted to:
acquire, from an external acquisition source, one or more of the contents associated with the selected two or more content indication marks joined by the line segment when reproducing the contents associated with the selected two or more content indication marks joined by the line segment.

12. The display apparatus according to claim 11, wherein the at least one processor is further adapted to:
with respect to each of the one or more of the contents acquired from the external acquisition source reproduce the content after the acquisition thereof is completed or in course of the acquisition thereof.

13. The display apparatus according to claim 10, wherein the at least one processor is further adapted to:
with respect to each of the selected two or more content indication marks, reproduce a content selected from among the content associated with the selected content indication mark and one or more contents associated with one or more content indication marks that are placed close to the selected content indication mark.

14. A display method comprising:
causing a display to display an image that contains a plurality of content indication marks each associated with a separate content, each of the plurality of content indication marks being arranged at a position corresponding to an impression of the content associated;

selecting two or more content indication marks from the plurality of content indication marks arranged in the image;

displaying, on the image, a line segment that join the two or more content indication marks selected in said selecting step so as to indicate an order in which the contents associated with the selected two or more content indication marks are arranged; and when the contents are reproduced in the order indicated by the line segment, changing a mode of display of the line segment in accordance with a current reproduction position of the contents.

15. At least one computer-readable storage medium having encoded thereon computer-executable instructions that, when executed by an information processing apparatus, cause the information processing apparatus to perform the steps of:

causing a display to display an image that contains a plurality of content indication marks each associated with a separate content, each of the plurality of content indication marks being arranged at a position associated with an impression of the content associated;

selecting two or more content indication marks from the plurality of content indication marks arranged in the image;

displaying, on the image, a line segment that join the two or more content indication marks selected in said selecting step so as to indicate an order in which the contents associated with the selected two or more content indication marks are arranged; and when the contents are reproduced in the order indicated by the line segment, changing a mode of display of the line segment in accordance with a current reproduction position of the contents.

* * * * *